(12) United States Patent
Nunnink et al.

(10) Patent No.: US 9,070,031 B2
(45) Date of Patent: *Jun. 30, 2015

(54) INTEGRATED ILLUMINATION ASSEMBLY FOR SYMBOLOGY READER

(75) Inventors: Laurens Nunnink, Simpelveld (NL); William H. Equitz, Brookline, MA (US)

(73) Assignee: Cognex Technology and Investment LLC, Natick, MA (US)

( * ) Notice: Subject to any disclaimer, the term of this patent is extended or adjusted under 35 U.S.C. 154(b) by 361 days.

This patent is subject to a terminal disclaimer.

(21) Appl. No.: 13/340,752

(22) Filed: Dec. 30, 2011

(65) Prior Publication Data

US 2012/0168509 A1 Jul. 5, 2012

Related U.S. Application Data

(63) Continuation-in-part of application No. 13/294,286, filed on Nov. 11, 2011, now Pat. No. 8,342,405, which is a continuation of application No. 12/900,593, filed on Oct. 8, 2010, now Pat. No. 8,061,614, which is a (Continued)

(51) Int. Cl.
*G06K 7/14* (2006.01)
*G06K 7/10* (2006.01)
*H04N 1/107* (2006.01)

(52) U.S. Cl.
CPC .... *G06K 7/10732* (2013.01); *G06K 2207/1011* (2013.01); *H04N 1/107* (2013.01)

(58) Field of Classification Search
USPC .................................... 235/455, 473, 462.06
See application file for complete search history.

(56) References Cited

U.S. PATENT DOCUMENTS

| | | | |
|---|---|---|---|
| 2,357,378 A | 9/1944 | Benford |
| 3,726,998 A | 4/1973 | Szpak |
| 3,857,626 A | 12/1974 | Rosenberger |
| 3,961,198 A | 6/1976 | Aungst |
| 4,240,748 A | 12/1980 | Blanc et al. |
| 4,282,425 A | 8/1981 | Chadima, Jr. |

(Continued)

FOREIGN PATENT DOCUMENTS

| | | | |
|---|---|---|---|
| CN | 1426570 A | 6/2003 |
| DE | 3737792 A1 | 5/1989 |

(Continued)

OTHER PUBLICATIONS

Japanese Patent Application No. 2008537812. Notification of Reasons for Rejection. English Translation. dated Feb. 28, 2012.

(Continued)

*Primary Examiner* — Allyson Trail
(74) *Attorney, Agent, or Firm* — Quarles & Brady LLP

(57) ABSTRACT

Systems and methods provide an illumination assembly for a mark reader. A light transmitter is arranged in a surrounding relationship to an interior area, with the light transmitter having a proximal end and a distal end. An illumination source provides a light for transmission into the light transmitter. The light transmitter distal end allows the light from within the light transmitter to pass through and out of the distal end to provide bright field illumination and dark field illumination. The light transmitter distal end may include a first portion and a second portion, where light from within the light transmitter passes through and out of the first portion to provide bright field illumination, and light from within the light transmitter passes through and out of the second portion to provide dark field illumination.

36 Claims, 29 Drawing Sheets

Related U.S. Application Data continuation of application No. 10/693,626, filed on Oct. 24, 2003, now Pat. No. 7,823,783, application No. 13/340,752, which is a continuation-in-part of application No. 12/900,605, filed on Oct. 8, 2010, now Pat. No. 8,672,227, which is a continuation of application No. 11/019,763, filed on Dec. 21, 2004, now Pat. No. 7,823,789, application No. 13/340,752, which is a continuation-in-part of application No. 12/900,617, filed on Oct. 8, 2010, which is a continuation of application No. 11/257,411, filed on Oct. 24, 2005, now Pat. No. 7,874,487.

(56) References Cited

U.S. PATENT DOCUMENTS

| | | |
|---|---|---|
| 4,570,057 A | 2/1986 | Chadima, Jr. |
| 4,743,773 A | 5/1988 | Katana |
| 4,766,300 A | 8/1988 | Chadima, Jr. |
| 4,820,911 A | 4/1989 | Arackellian |
| 4,894,523 A | 1/1990 | Chadima, Jr. |
| 4,929,053 A | 5/1990 | Muller-Stute et al. |
| 4,969,037 A | 11/1990 | Poleschinski |
| 5,019,699 A | 5/1991 | Koenck |
| 5,149,948 A | 9/1992 | Chisholm |
| 5,177,346 A | 1/1993 | Chisholm |
| 5,202,817 A | 4/1993 | Koenck |
| 5,227,614 A | 7/1993 | Danielson |
| 5,239,169 A | 8/1993 | Thomas |
| 5,258,606 A | 11/1993 | Chadima, Jr. |
| 5,291,009 A | 3/1994 | Roustaei |
| 5,309,277 A | 5/1994 | Deck |
| 5,313,373 A | 5/1994 | Bjorner |
| 5,319,182 A | 6/1994 | Havens |
| 5,331,176 A | 7/1994 | Sant' Anselmo |
| 5,349,172 A | 9/1994 | Roustaei |
| 5,354,977 A | 10/1994 | Roustaei |
| 5,359,185 A | 10/1994 | Hanson |
| 5,367,439 A | 11/1994 | Mayer |
| 5,374,817 A | 12/1994 | Bard |
| 5,378,883 A | 1/1995 | Batterman |
| 5,393,967 A | 2/1995 | Rice et al. |
| 5,406,060 A | 4/1995 | Gitin |
| 5,408,084 A | 4/1995 | Brandorff |
| 5,414,251 A | 5/1995 | Durbin |
| 5,422,472 A | 6/1995 | Tavislan et al. |
| 5,430,285 A | 7/1995 | Karpen |
| 5,434,618 A | 7/1995 | Hayashi |
| 5,449,892 A | 9/1995 | Yamada |
| 5,461,417 A | 10/1995 | White |
| 5,463,214 A | 10/1995 | Longacre, Jr. |
| 5,469,294 A | 11/1995 | Wilt |
| 5,481,098 A | 1/1996 | Davis |
| 5,484,994 A | 1/1996 | Roustaei |
| 5,500,516 A | 3/1996 | Durbin |
| 5,504,317 A | 4/1996 | Takahashi |
| 5,504,367 A | 4/1996 | Arackellian |
| 5,513,264 A | 4/1996 | Wang et al. |
| 5,514,858 A | 5/1996 | Ackley |
| 5,515,452 A | 5/1996 | Penkethman |
| 5,532,467 A | 7/1996 | Roustaei |
| 5,569,902 A | 10/1996 | Wood |
| 5,576,527 A | 11/1996 | Sawanobori |
| 5,585,616 A | 12/1996 | Roxby |
| 5,586,212 A | 12/1996 | McConica |
| 5,591,955 A | 1/1997 | Laser |
| 5,598,007 A | 1/1997 | Bunce |
| 5,606,160 A | 2/1997 | Tani |
| 5,619,029 A | 4/1997 | Roxby |
| 5,623,137 A | 4/1997 | Powers |
| 5,654,533 A | 8/1997 | Suzuki et al. |
| 5,654,540 A | 8/1997 | Stanton |
| 5,659,167 A | 8/1997 | Wang |
| 5,684,290 A | 11/1997 | Arackellian |
| 5,690,417 A | 11/1997 | Polidor et al. |
| 5,697,699 A | 12/1997 | Seo |
| 5,703,348 A | 12/1997 | Suzuki |
| 5,715,095 A | 2/1998 | Hiratsuka |
| 5,723,868 A | 3/1998 | Hammond, Jr. |
| 5,734,153 A | 3/1998 | Swartz |
| 5,743,633 A | 4/1998 | Chau |
| 5,750,974 A | 5/1998 | Sasaki |
| 5,756,981 A | 5/1998 | Roustaei |
| 5,773,810 A | 6/1998 | Hussey |
| 5,777,314 A | 7/1998 | Roustaei |
| 5,780,834 A | 7/1998 | Havens |
| 5,783,811 A | 7/1998 | Feng |
| 5,786,586 A | 7/1998 | Pidhirny |
| 5,793,033 A | 8/1998 | Feng |
| 5,811,784 A | 9/1998 | Tausch |
| 5,834,754 A | 11/1998 | Feng |
| 5,859,418 A | 1/1999 | Li |
| 5,861,910 A | 1/1999 | McGarry |
| 5,886,338 A | 3/1999 | Arackellian |
| 5,894,348 A | 4/1999 | Bacchi |
| 5,903,391 A | 5/1999 | Toshima |
| 5,907,148 A | 5/1999 | Iwafuchi |
| 5,920,643 A | 7/1999 | White |
| 5,923,020 A | 7/1999 | Kurokawa |
| 5,949,057 A | 9/1999 | Feng |
| 5,949,763 A | 9/1999 | Lund |
| 5,969,321 A | 10/1999 | Danielson et al. |
| 5,979,763 A | 11/1999 | Wang |
| 5,984,494 A | 11/1999 | Chapman |
| 5,992,751 A | 11/1999 | Laser |
| 6,011,586 A | 1/2000 | Lepior |
| 6,022,124 A | 2/2000 | Bourn |
| 6,033,090 A | 3/2000 | Seo |
| 6,034,379 A | 3/2000 | Bunte |
| 6,036,095 A | 3/2000 | Seo |
| 6,039,254 A | 3/2000 | Froese-Peeck |
| 6,039,255 A | 3/2000 | Seo |
| 6,042,012 A | 3/2000 | Olmstead |
| 6,045,047 A | 4/2000 | Pidhirny |
| 6,060,722 A | 5/2000 | Havens |
| 6,065,678 A | 5/2000 | Li |
| 6,073,852 A | 6/2000 | Seo |
| 6,105,869 A | 8/2000 | Scharf |
| 6,119,939 A | 9/2000 | Schwartz |
| 6,141,046 A | 10/2000 | Roth |
| 6,158,661 A | 12/2000 | Chadima, Jr. |
| 6,164,544 A | 12/2000 | Schwartz |
| 6,210,013 B1 | 4/2001 | Bousfield |
| 6,223,986 B1 | 5/2001 | Bobba |
| 6,234,397 B1 | 5/2001 | He |
| 6,247,645 B1 | 6/2001 | Harris |
| 6,249,008 B1 | 6/2001 | Bunte |
| 6,250,551 B1 | 6/2001 | He |
| 6,260,763 B1 | 7/2001 | Svetal |
| 6,267,294 B1 | 7/2001 | Stern |
| 6,283,374 B1 | 9/2001 | Fantone |
| 6,330,974 B1 | 12/2001 | Ackley |
| 6,340,114 B1 | 1/2002 | Correa |
| 6,341,878 B1 | 1/2002 | Chiang |
| 6,347,163 B2 | 2/2002 | Roustaei |
| 6,347,874 B1 | 2/2002 | Boyd |
| 6,352,204 B2 | 3/2002 | Hattersley |
| 6,360,948 B1 | 3/2002 | Yang |
| 6,371,374 B1 | 4/2002 | Schwartz |
| 6,385,352 B1 | 5/2002 | Roustaei |
| 6,385,507 B1 | 5/2002 | Buijtels |
| 6,394,349 B1 | 5/2002 | Shigekusa |
| 6,405,925 B2 | 6/2002 | He |
| 6,407,810 B1 | 6/2002 | Liu |
| 6,429,934 B1 | 8/2002 | Dunn |
| 6,435,411 B1 | 8/2002 | Massieu |
| 6,491,223 B1 | 12/2002 | Longacre, Jr. |
| 6,505,778 B1 | 1/2003 | Reddersen |
| 6,513,714 B1 | 2/2003 | Davis |
| 6,542,238 B1 | 4/2003 | Tsuboi et al. |
| 6,547,146 B1 | 4/2003 | Meksavan |
| 6,575,367 B1 | 6/2003 | Longacre, Jr. |
| 6,581,838 B1 | 6/2003 | Meksavan |
| 6,592,040 B2 | 7/2003 | Barkan |

(56) References Cited

U.S. PATENT DOCUMENTS

| | | |
|---|---|---|
| 6,595,422 B1 | 7/2003 | Doljack |
| 6,598,797 B2 | 7/2003 | Lee |
| 6,601,768 B2 | 8/2003 | McCall |
| 6,607,128 B1 | 8/2003 | Schwartz |
| 6,607,132 B1 | 8/2003 | Dvorkis |
| 6,621,065 B1 | 9/2003 | Fukumoto |
| 6,659,350 B2 | 12/2003 | Schwartz |
| 6,661,521 B1 | 12/2003 | Stern |
| 6,681,037 B1 | 1/2004 | Koljonen |
| 6,689,998 B1 | 2/2004 | Bremer |
| 6,729,546 B2 | 5/2004 | Roustaei |
| 6,760,165 B2 | 7/2004 | Wulff |
| 6,803,088 B2 | 10/2004 | Kaminsky |
| 6,809,847 B2 | 10/2004 | McQueen |
| 6,831,290 B2 | 12/2004 | Mentzer |
| 6,832,725 B2 | 12/2004 | Gardiner |
| 6,854,650 B2 | 2/2005 | Hattersley et al. |
| 6,860,428 B1 | 3/2005 | Dowling |
| 6,914,679 B2 | 7/2005 | Nettekoven |
| 7,021,542 B2 | 4/2006 | Patel |
| 7,025,271 B2 | 4/2006 | Dvorkis |
| 7,025,272 B2 | 4/2006 | Yavid |
| 7,025,273 B2 | 4/2006 | Breytman |
| 7,025,572 B2 | 4/2006 | Miyagawa |
| 7,038,853 B2 | 5/2006 | Li |
| 7,044,377 B2 | 5/2006 | Patel |
| 7,090,132 B2 | 8/2006 | Havens |
| 7,128,266 B2 | 10/2006 | Zhu |
| 7,131,587 B2 | 11/2006 | He |
| 7,159,764 B1 | 1/2007 | White |
| 7,163,149 B2 | 1/2007 | He |
| 7,180,052 B1 | 2/2007 | Barkan |
| 7,187,825 B2 | 3/2007 | Lim |
| 7,204,418 B2 | 4/2007 | Joseph |
| 7,204,420 B2 | 4/2007 | Barkan |
| 7,224,540 B2 | 5/2007 | Olmstead |
| 7,225,989 B2 | 6/2007 | Zhu |
| 7,240,844 B2 | 7/2007 | Zhu |
| 7,253,384 B2 | 8/2007 | Barnes |
| 7,267,282 B2 | 9/2007 | Zhu |
| 7,270,274 B2 | 9/2007 | Hennick |
| 7,278,575 B2 | 10/2007 | Zhu |
| 7,281,661 B2 | 10/2007 | Zhu |
| 7,296,749 B2 | 11/2007 | Massieu |
| 7,299,310 B2 | 11/2007 | Aschenbrenner |
| 7,306,155 B2 | 12/2007 | Hennick |
| 7,314,173 B2 | 1/2008 | Philyaw |
| 7,331,524 B2 | 2/2008 | Vinogradov |
| 7,360,705 B2 | 4/2008 | Heinrich |
| 7,451,917 B2 | 11/2008 | McCall |
| 7,490,774 B2 | 2/2009 | Zhu |
| 7,520,434 B2 | 4/2009 | Jolivet |
| 7,568,628 B2 | 8/2009 | Wang |
| 7,604,174 B2 | 10/2009 | Gerst, III |
| 7,617,984 B2 | 11/2009 | Nunnink |
| 7,793,017 B2 | 9/2010 | Gehring |
| 7,823,783 B2 | 11/2010 | Gerst et al. |
| 7,823,789 B2 | 11/2010 | Nunnink |
| 7,861,037 B2 | 12/2010 | McAvoy |
| 7,874,487 B2 | 1/2011 | Nunnink et al. |
| RE42,337 E | 5/2011 | Ward |
| 7,967,632 B2 | 6/2011 | Kiryu |
| 8,061,613 B2 | 11/2011 | Gerst et al. |
| 8,061,614 B2 | 11/2011 | Gerst et al. |
| 8,069,289 B2 | 11/2011 | Hafer et al. |
| 8,286,878 B2 | 10/2012 | Nunnink |
| 2001/0027999 A1 | 10/2001 | Lee |
| 2002/0000472 A1 | 1/2002 | Hattersley et al. |
| 2002/0030094 A1 | 3/2002 | Curry et al. |
| 2002/0074403 A1 | 6/2002 | Krichever et al. |
| 2002/0080187 A1 | 6/2002 | Lawton |
| 2002/0096566 A1 | 7/2002 | Schwartz et al. |
| 2002/0104887 A1 | 8/2002 | Schlieffers et al. |
| 2002/0125322 A1 | 9/2002 | McCall et al. |
| 2002/0170970 A1 | 11/2002 | Ehrhart |
| 2003/0001018 A1 | 1/2003 | Hussey et al. |
| 2003/0029917 A1 | 2/2003 | Hennick et al. |
| 2003/0034394 A1 | 2/2003 | Gannon et al. |
| 2003/0058631 A1 | 3/2003 | Yoneda |
| 2003/0062413 A1 | 4/2003 | Gardiner et al. |
| 2003/0062418 A1 | 4/2003 | Barber et al. |
| 2003/0080187 A1 | 5/2003 | Piva et al. |
| 2003/0080189 A1 | 5/2003 | Patel et al. |
| 2003/0163623 A1 | 8/2003 | Yeung |
| 2004/0069855 A1 | 4/2004 | Patel et al. |
| 2004/0156539 A1 | 8/2004 | Jansson et al. |
| 2004/0217173 A1 | 11/2004 | Lizotte et al. |
| 2004/0238637 A1 | 12/2004 | Russell et al. |
| 2005/0029439 A1 | 2/2005 | Benedict |
| 2005/0045725 A1 | 3/2005 | Gurevich et al. |
| 2005/0047723 A1 | 3/2005 | Li |
| 2005/0087601 A1 | 4/2005 | Gerst, III et al. |
| 2005/0117144 A1 | 6/2005 | Greenway et al. |
| 2005/0180037 A1 | 8/2005 | Masterson |
| 2005/0199725 A1 | 9/2005 | Craen et al. |
| 2006/0027657 A1 | 2/2006 | Ninnink et al. |
| 2006/0027659 A1 | 2/2006 | Patel et al. |
| 2006/0032921 A1 | 2/2006 | Gerst, III et al. |
| 2006/0060653 A1 | 3/2006 | Wittenberg et al. |
| 2006/0131419 A1 | 6/2006 | Nunnink |
| 2006/0133757 A1 | 6/2006 | Nunnink |
| 2006/0266840 A1 | 11/2006 | Vinogradov et al. |
| 2007/0090193 A1 | 4/2007 | Nunnink et al. |
| 2007/0091332 A1 | 4/2007 | Nunnink |
| 2007/0152064 A1 | 7/2007 | Nunnink et al. |
| 2007/0206183 A1 | 9/2007 | Lebens |
| 2008/0170380 A1 | 7/2008 | Pastore |

FOREIGN PATENT DOCUMENTS

| | | |
|---|---|---|
| DE | 4003983 C1 | 8/1991 |
| DE | 3931044 C2 | 1/1992 |
| DE | 4123916 A1 | 1/1992 |
| DE | 10026301 A1 | 11/2001 |
| DE | 10113426 A1 | 9/2002 |
| EP | 0185782 B1 | 3/1989 |
| EP | 0356680 A1 | 3/1990 |
| EP | 1158460 A2 | 11/2001 |
| JP | S5362387 A | 6/1978 |
| JP | 59163677 | 9/1984 |
| JP | 61-034681 | 2/1986 |
| JP | 63-18209 | 1/1988 |
| JP | 02100580 A | 4/1990 |
| JP | 0353784 A | 3/1991 |
| JP | 03537894 | 3/1991 |
| JP | 04223583 A | 8/1992 |
| JP | 6-139398 | 5/1994 |
| JP | 06124361 A | 5/1994 |
| JP | 07271890 A | 10/1995 |
| JP | 08129597 A | 5/1996 |
| JP | 08287176 A | 11/1996 |
| JP | 0962831 A | 3/1997 |
| JP | 10134133 A | 5/1998 |
| JP | 11312898 | 11/1999 |
| JP | 2000231600 A | 8/2000 |
| JP | 2001043301 A | 2/2001 |
| JP | 2001307011 A | 11/2001 |
| JP | 2002525644 | 8/2002 |
| JP | 2003503701 A | 1/2003 |
| JP | 2004-127215 | 4/2004 |
| JP | 2005122355 | 5/2005 |
| JP | 2007028088 A | 2/2007 |
| JP | 2007546762 | 11/2007 |
| WO | 9112489 A1 | 8/1991 |
| WO | 9216909 A1 | 10/1992 |
| WO | 9419908 | 9/1994 |
| WO | 9949347 A1 | 9/1999 |
| WO | 0016073 A1 | 3/2000 |
| WO | 0101118 | 1/2001 |
| WO | 0163258 A1 | 8/2001 |
| WO | 0165469 A1 | 9/2001 |

(56) References Cited

FOREIGN PATENT DOCUMENTS

| | | |
|---|---|---|
| WO | 02075637 A1 | 9/2002 |
| WO | 2004006438 A2 | 1/2004 |
| WO | 2005043449 | 5/2005 |

OTHER PUBLICATIONS

PCT International Search Report and Written Opinion, PCT/US2004/034389, May 2, 2005.
PCT International Search Report and Written Opinion, PCT/US2004/034872, Feb. 24, 2005.
PCT International Search Report, PCT/US2005/044452, Mar. 20, 2006.
PCT International Search Report and Written Opinion, PCT/US2005/044466, Apr. 12, 2006.
PCT International Search Report and Written Opinion, PCT/US2006/041041, May 25, 2007.
Japan Patent Office, Notification of Reasons for Refusal, Application No. 2006-536784, Oct. 6, 2009.
German Patent and Trademark Office, Official Action, Application No. 102 91 122.3, Apr. 29, 2010.
German Patent and Trademark Office, Official Action, Application No. 102 91 122.3, Mar. 14, 2013.
State Intellectual Property Office, P.R. China, First Office Action, Application No. 200680048666.8, Mar. 19, 2010.
German Patent and Trademark Office, Official Action, Application No. 11 2006 002 867.7, Jan. 23, 2013.
U.S. Patent Office Notice of Allowance for U.S. Appl. No. 10/911,989, pp. 1-7, dated Jun. 3, 2009.
U.S. Patent Office Non-Final Office Action for U.S. Appl. No. 10/911,989, pp. 1-11, dated Oct. 17, 2008.
U.S. Patent Office Final Office Action for U.S. Appl. No. 10/911,989, pp. 1-11, dated Sep. 26, 2007.
U.S. Patent Office Non-Final Office Action for U.S. Appl. No. 10/911,989, pp. 1-11, dated Feb. 21, 2007.
U.S. Patent Office Notice of Allowance for U.S. Appl. No. 10/693,626, pp. 1-7, dated Dec. 21, 2009.
U.S. Patent Office Final Office Action for U.S. Appl. No. 10/693,626, pp. 1-17, dated Feb. 22, 2008.
U.S. Patent Office Non-Final Office Action for U.S. Appl. No. 10/693,626, pp. 1-9, dated Jul. 26, 2007.
U.S. Patent Office Final Office Action for U.S. Appl. No. 10/693,626, pp. 1-10, dated Dec. 1, 2006.
U.S. Patent Office Non-Final Office Action for U.S. Appl. No. 10/693,626, pp. 1-9, dated Jun. 15, 2006.
U.S. Patent Office Non-Final Office Action for U.S. Appl. No. 10/693,626, pp. 1-9, dated Dec. 13, 2005.
U.S. Patent Office Non-Final Office Action for U.S. Appl. No. 10/693,626, pp. 1-9, dated Jun. 28, 2005.
U.S. Patent Office Non-Final Office Action for U.S. Appl. No. 10/693,626, pp. 1-11, dated Oct. 17, 2008.
U.S. Patent Office Notice of Allowance for U.S. Appl. No. 11/019,763, pp. 1-6, dated Aug. 11, 2009.
U.S. Patent Office Ex Parte Quayle Action for U.S. Appl. No. 11/019,763, pp. 1-5, dated Apr. 16, 2009.
U.S. Patent Office Notice of Allowance for U.S. Appl. No. 11/019,763, pp. 1-6, dated Nov. 5, 2008.
U.S. Patent Office Non-Final Office Action for U.S. Appl. No. 11/019,763, pp. 1-6, dated Apr. 11, 2008.
U.S. Patent Office Final Office Action for U.S. Appl. No. 11/019,763, pp. 1-8, dated Nov. 27, 2007.
U.S. Patent Office Non-Final Office Action for U.S. Appl. No. 11/019,763, pp. 1-7, dated Jun. 12, 2007.
U.S. Patent Office Notice of Allowance for U.S. Appl. No. 11/322,370, pp. 1-7, dated Dec. 2, 2009.
U.S. Patent Office Notice of Allowance for U.S. Appl. No. 11/322,370, pp. 1-8, dated Jun. 30, 2009.
U.S. Patent Office Non-Final Office Action for U.S. Appl. No. 11/322,370, pp. 1-11, dated Nov. 25, 2008.
U.S. Patent Office Examiner Interview Summary for U.S. Appl. No. 11/322,370, pp. 1-2, dated Nov. 13, 2008.
U.S. Patent Office Final Office Action for U.S. Appl. No. 11/322,370, pp. 1-8, dated Sep. 5, 2008.
U.S. Patent Office Non-Final Office Action for U.S. Appl. No. 11/322,370, pp. 1-7, dated Jan. 7, 2008.
U.S. Patent Office Examiner Interview Summary for U.S. Appl. No. 11/322,370, p. 1, dated Dec. 3, 2007.
U.S. Patent Office Final Office Action for U.S. Appl. No. 11/322,370, pp. 1-9, dated Oct. 4, 2007.
U.S. Patent Office Non-Final Office Action for U.S. Appl. No. 11/322,370, pp. 1-10, dated Mar. 6, 2007.
U.S. Patent Office Notice of Allowance for U.S. Appl. No. 11/014,478, 6 pages, dated Jul. 1, 2009.
U.S. Patent Office Non-Final Office Action for U.S. Appl. No. 11/014,478, pp. 1-8, dated Jan. 24, 2006.
U.S. Patent Office Notice of Allowance for U.S. Appl. No. 11/321,702, 7 pages, dated Jun. 25, 2009.
U.S. Patent Office Non-Final Office Action for U.S. Appl. No. 11/321,702, pp. 1-7, dated Jun. 25, 2008.
U.S. Patent Office Notice of Allowance for U.S. Appl. No. 12/573,402, 9 pages, dated Jun. 6, 2012.
U.S. Patent Office Non-Final Office Action for U.S. Appl. No. 12/573,402, pp. 1-11, dated Apr. 5, 2011.
U.S. Patent Office Non-Final Office Action for U.S. Appl. No. 12/573,402, pp. 1-8, dated Sep. 22, 2010.
U.S. Patent Office Non-Final Office Action for U.S. Appl. No. 12/573,402, pp. 1-8, dated May 25, 2010.
U.S. Patent Office Non-Final Office Action for U.S. Appl. No. 11/257,411, pp. 1-5, Nov. 6, 2009.
U.S. Patent Office Non-Final Office Action for U.S. Appl. No. 11/257,411, pp. 1-6, Feb. 23, 2009.
Cognex Corporation, AcuReader/OCR, Accurate, Fast Water Identification, 1995-1996.
Cognex Corporation, 50mm Ring Light Image Formation System, for the In-Sight 5000 Series ID Readers, 2006.
Vision-Supplies.com, Siemens LytePipe 1.5×30, 1999.
CCS Inc., LFX-series Lights, http://www.ccs-inc.co.jp/cgi-bin/hp.cgi?menu=102-115-01e, Feb. 12, 2009.
Cognex Corporation, DataMan 6500 Series, Quick Reference, 2004.
Cognex Corporation, DataMan 7500 Series, Handheld Models, Cognex Machine Vision System and Machine Vision Sensors, 2009.
InData Systems, 4410LDS Hand Held Etched 2D Image Reader, 27 Fennell Street, Skaneateles, Ny, 13152, www.indatasys.com., Jan. 1, 2005.
Cognex Corporation, Diffuse Ring Light Installation Instructions, In-Sight, 2006.
Cognex Corporation, DataMan Handheld ID Readers, 2005.
Cognex Corporation, DataMan 6500 Series, Quick Reference Guide, Aug. 2004.
Civil Action, 1:13-cv-02027-JSR. Civil Docket, U.S. District Court, Sourthern District of New York (Foley Square), dated Sep. 17, 2013. 13 pages.
Civil Action, 1:13-cv-02027-JSR. Plaintiffs' Complaint and Jury Trial Demand filed Mar. 26, 2013. 39 pages.
Civil Action, 1:13-cv-02027-JSR. Defendants' Notice of Motion to Stay This Action Pending Reexamination of U.S. Patent No. 7,874,487 filed May 6, 2013. 3 pages.
Civil Action, 1:13-cv-02027-JSR. Defendants Memorandum of Law in Support of Defendants' Motion to Stay This Action Pending Reexamination of U.S. Patent No. 7,874,487 filed May 6, 2013. 21 pages.
Civil Action, 1:13-cv-02027-JSR. Declaration of Bruce Robert Scharf in Support of Defendants' Motion to Stay This Action Pending Reexamination of U.S. Patent No. 7,874,487 filed May 6, 2013. 6 pages.
Civil Action, 1:13-cv-02027-JSR. Declaration of Colin Garry in Support of Defendants' Motion to Stay This Action Pending Reexamination of U.S. Patent No. 7,874,487 filed May 6, 2013. 16 pages.
Civil Action, 1:13-cv-02027-JSR. Declaration of Jacob K. Baron in Opposition of Defendants' Motion to Stay This Action Pending Reexamination of U.S. Patent No. 7,874,487 filed May 20, 2013. 2 pages.

(56) References Cited

OTHER PUBLICATIONS

Civil Action, 1:13-cv-02027-JSR. Plaintiff Cognex's Opposition to Defendants' Motion to Stay This Action Pending Reexamination of U.S. Patent No. 7,874,487 filed May 20, 2013. 13 pages.
Civil Action, 1:13-cv-02027-JSR. Defendants' Notice of Motion for Summary Judgment that Claims of U.S. Patent No. 7,874,487 are Invalid filed Jun. 3, 2013. 3 pages.
Civil Action, 1:13-cv-02027-JSR. Defendants' Memorandum of Law in Support of Defendants' Motion for Summary Judgment that Claims of U.S. Patent No. 7,874,487 are Invalid filed Jun. 3, 2013. 28 pages.
Civil Action, 1:13-cv-02027-JSR. Declaration of Colin J. Garry in Support of Defendants' Motion for Summary Judgment that Claims of U.S. Patent No. 7,874,487 are invalid filed Jun. 3, 2013. 162 pages.
Civil Action, 1:13-cv-02027-JSR Declaration of Jacob K. Baron in Opposition to Defendant's Motion for Summary Judgment that Claims of U.S. Patent No. 7,874,487 are Invalid filed Jun. 17, 2013. 7 pages.
Civil Action, 1:13-cv-02027-JSR. Cognex's Opposition to Defendant's Motion for Summary Judgment that Claims of U.S. Patent No. 7,874,487 are Invalid filed Jun. 17, 2013. 26 pages.
Civil Action, 1:13-cv-02027-JSR. Cognex's Statement of Material Facts Submitted in Opposition to Defendants' Motion for Summary Judgment filed Jun. 17, 2013. 8 pages.
Civil Action, 1:13-cv-02027-JSR. Defendants' Reply in Support of Defendants' Motion for Summary Judgment that Claims of U.S. Patent No. 7,874,487 are Invalid filed Jun. 24, 2013. 14 pages.
Civil Action, 1:13-cv-02027-JSR. Declaration of Colin Garry in Support of Defendants' Motion for Summary Judgment that Claims of U.S. Patent No. 7,874,487 are Invalid filed Jun. 24, 2013. 20 pages.
Civil Action, 1:13-cv-02027-JSR. Defendants' Local Rule 56.1 Statement Submitted in Reply to Cognex's Statement of Material Facts filed Jun. 24, 2013. 26 pages.
Civil Action, 1:13-cv-02027-JSR. Plaintiffs' Claim Constructions in Opposition to Defendants' Motion for Summary Judgment filed Jul. 10, 2013. 3 pages.
Civil Action, 1:13-cv-02027-JSR. Defendants' Response to Plaintiffs' Proposed Claim Constructions in Opposition to Defendants' Motion for Summary Judgment of Invalidity of Claims of U.S. Patent No. 7,874,487 filed Jul. 15, 2013. 5 pages.
Civil Action, 1:13-cv-02027-JSR. Plaintiffs' Notice of Supplemental Authority Reporting on Action from the Patent Office filed Jul. 17, 2013. 14 pages.
Civil Action, 1:13-cv-02027-JSR. Plaintiffs' Opening Claim Construction Brief filed Aug. 2, 2013. 31 pages.
Civil Action, 1:13-cv-02027-JSR. Declaration of Jacob K. Baron in Support of Plaintiffs' (D•em. Claim Construction Brief filed Aug. 2, 2013. 159 pages.
Civil Action, 1:13-cv-02027-JSR. Defendants' Claim Construction Response Brief filed Aug. 9, 2013. 31 pages.
Civil Action, 1:13-cv-02027-JSR. Declaration of Colin J. Garry in Support of Defendants' Claim Construction Response Brief filed Aug. 10, 2013. 172 pages.
Civil Action, 1:13-cv-02027-JSR. Plaintiffs' Reply Claim Construction Brief filed Aug. 16, 2013. 15 pages.
Civil Action, 1:13-cv-02027-JSR. Order Regarding Defendants' Motion for Summary Judgment that Claims of U.S. Patent No. 7,874,487 are Invalid dated Aug. 29, 2013. 1 page.
Civil Action, 1:13-cv-02027-JSR. Modified Order Regarding Defendants' Motion for Summary Judgment that Claims of U.S. Patent No. 7,874,487 are Invalid dated Aug. 29, 2013. 1 page.
Civil Action, 1:13-cv-02027-JSR. Plaintiffs' Notice of Motion for Summary Judgment of No Invalidity filed Sep. 16, 2013. 3 pages.
Civil Action, 1:13-cv-02027-JSR. Notice of Motion for Summary Judgment That the Mobile Hawk Device Does Not Infringe U.S. Patent No. 7,874,487 filed Sep. 16, 2013. 3 pages.
Civil Action, 1:13-cv-02027-JSR. Notice of Motion for Summary Judgment That Claims 1 and 30 of U.S. Patent No. 7,874,487 are Invalid as Anticipated by the Hawkeye 5x Handheld Readers filed Sep. 16, 2013. 3 pages.
Civil Action, 1:13-cv-02027-JSR. Memorandum Order filed Sep. 17, 2013. 5 pages.

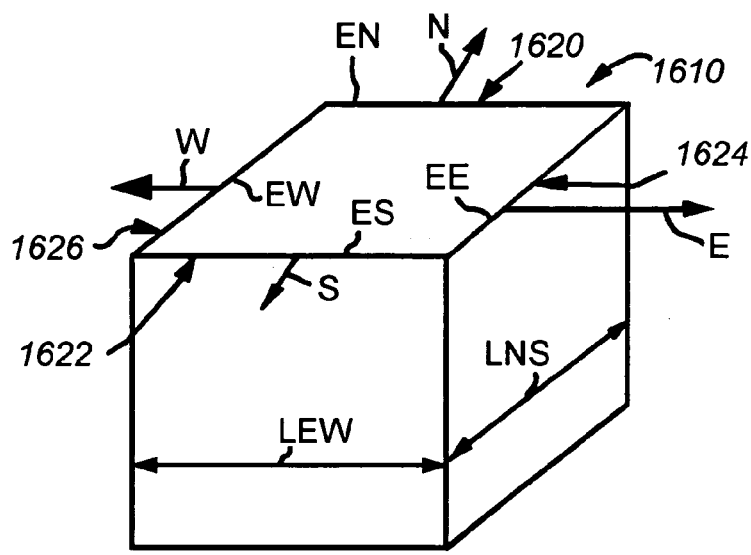
Fig. 16
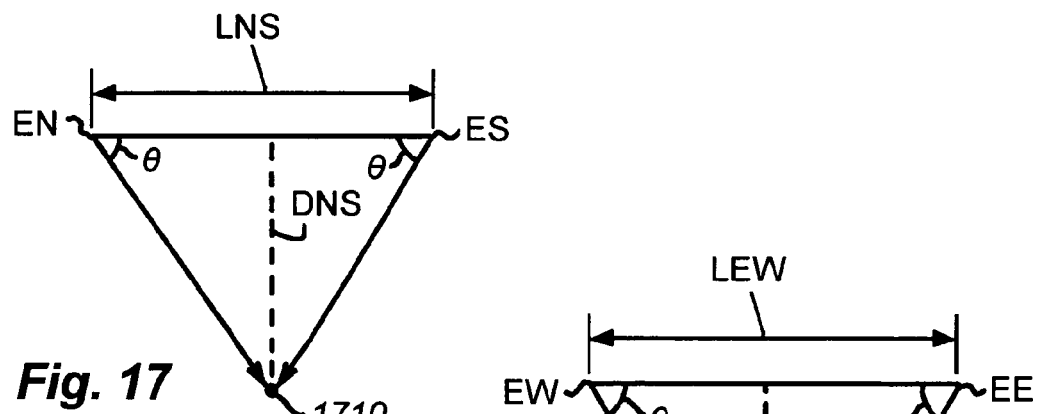
Fig. 17
Fig. 18

INTEGRATED ILLUMINATION ASSEMBLY FOR SYMBOLOGY READER

CROSS-REFERENCE TO RELATED APPLICATIONS

This application is a continuation-in-part of U.S. patent application Ser. No. 13/294,286, filed Nov. 11, 2011 now U.S. Pat. No. 8,342,405, and entitled "Light Pipe Illumination System and Method," which is a continuation of U.S. patent application Ser. No. 12/900,593 filed Oct. 8, 2010, now U.S. Pat. No. 8,061,614 dated Nov. 22, 2011, and entitled "Light Pipe Illumination System and Method," which is a continuation of U.S. patent application Ser. No. 10/693,626 filed Oct. 24, 2003, now U.S. Pat. No. 7,823,783 dated Nov. 2, 2010, and also entitled "Light Pipe Illumination System and Method," both of which are hereby incorporated by reference.

This application is also a continuation-in-part of U.S. patent application Ser. No. 12/900,605 filed Oct. 8, 2010 now U.S. Pat. No. 8,672,227, and entitled "Low Profile Illumination for Direct Part Mark Reader," which is a continuation of U.S. patent application Ser. No. 11/019,763 filed Dec. 21, 2004, now U.S. Pat. No. 7,823,789 dated Nov. 2, 2010, and also entitled "Low Profile Illumination for Direct Part Mark Reader," both of which are hereby incorporated by reference.

This application is a continuation-in-part of U.S. patent application Ser. No. 12/900,617 filed Oct. 8, 2010, and entitled "Integrated Illumination Assembly for Symbology Reader," which is a continuation of U.S. patent application Ser. No. 11/257,411 filed Oct. 24, 2005, now U.S. Pat. No. 7,874,487 dated Jan. 25, 2011, and also entitled "Integrated Illumination Assembly for Symbology Reader," both of which are hereby incorporated by reference.

STATEMENT CONCERNING FEDERALLY SPONSORED RESEARCH OR DEVELOPMENT

Not applicable.

FIELD OF THE INVENTION

This invention relates to machine vision systems and symbology readers that employ machine vision and more particularly to illuminators for the same.

BACKGROUND OF THE INVENTION

Machine vision systems use image acquisition devices that include camera sensors to deliver information on a viewed subject. The system then interprets this information according to a variety of algorithms to perform a programmed decision-making and/or identification function. For an image to be most-effectively acquired by a sensor in the visible, and near-visible light range, the subject should be properly illuminated.

In the example of symbology reading (also commonly termed "barcode" scanning) using an image sensor, proper illumination is highly desirable. Symbology reading entails the aiming of an image acquisition sensor (CMOS camera, CCD, etc.) at a location on an object that contains a symbol (a "barcode"), and acquiring an image of that symbol. The symbol contains a set of predetermined patterns that represent an ordered group of characters or shapes from which an attached data processor (for example, a microcomputer) can derive useful information about the object (e.g. its serial number, type, model, price, etc.). Symbols/barcodes are available in a variety of shapes and sizes. Two of the most commonly employed symbol types used in marking and identifying objects are the so-called one-dimensional barcode, consisting of a line of vertical stripes of varying width and spacing, and the so-called two-dimensional barcode consisting of a two-dimensional array of dots or rectangles.

By way of background FIG. 1 shows an exemplary scanning system 100 adapted for handheld operation. An exemplary handheld scanning appliance or handpiece 102 is provided. It includes a grip section 104 and a body section 106. An image formation system 151, shown in phantom, can be controlled and can direct image data to an on-board embedded processor 109. This processor can include a scanning software application 113 by which lighting is controlled, images are acquired and image data is interpreted into usable information (for example, alphanumeric strings derived from the symbols (such as the depicted two-dimensional barcode image 195). The decoded information can be directed via a cable 111 to a PC or other data storage device 112 having (for example) a display 114, keyboard 116 and mouse 118, where it can be stored and further manipulated using an appropriate application 121. Alternatively, the cable 111 can be directly connected to an interface in the scanning appliance and an appropriate interface in the computer 112. In this case the computer-based application 121 performs various image interpretation/decoding and lighting control functions as needed. The precise arrangement of the handheld scanning appliance with respect to an embedded processor, computer or other processor is highly variable. For example, a wireless interconnect can be provided in which no cable 111 is present. Likewise, the depicted microcomputer can be substituted with another processing device, including an onboard processor or a miniaturized processing unit such as a personal digital assistant or other small-scale computing device.

The scanning application 113 can be adapted to respond to inputs from the scanning appliance 102. For example, when the operator toggles a trigger 122 on the hand held scanning appliance 102, an internal camera image sensor (that is part of the image formation system 151) acquires an image of a region of interest 131 on an object 105. The exemplary region of interest includes a two-dimensional symbol 195 that can be used to identify the object 105. Identification and other processing functions are carried out by the scanning application 113, based upon image data transmitted from the hand held scanning appliance 102 to the processor 109. A visual indicator 141 can be illuminated by signals from the processor 109 to indicate a successful read and decode of the symbol 195.

In reading symbology or other subjects of interest, the type of illumination employed is of concern. Where symbology and/or other viewed subjects are printed on a flat surface with contrasting ink or paint, a diffuse, high-angle "bright field" illumination may best highlight these features for the sensor. By high-angle it is meant, generally, light that strikes the subject nearly perpendicularly (normal) or at an angle that is typically no more than about 45 degrees from perpendicular (normal) to the surface of the item being scanned. Such illumination is subject to substantial reflection back toward the sensor. By way of example, barcodes and other subjects requiring mainly bright field illumination may be present on a printed label adhered to an item or container, or on a printed field in a relatively smooth area of item or container.

Conversely, where a symbology or other subject is formed on a more-irregular surface, or is created by etching or peening a pattern directly on the surface, the use of highly reflective bright field illumination may be inappropriate. A peened/etched surface has two-dimensional properties that tend to scatter bright field illumination, thereby obscuring the acquired image. Where a viewed subject has such decidedly two-dimensional surface texture, it may be best illuminated with dark field illumination. This is an illumination with a characteristic low angle (approximately 45 degrees or less, for example) with respect to the surface of the subject (i.e. an angle of more than approximately 45 degrees with respect to normal). Using such low-angle, dark field illumination, two-dimensional surface texture is contrasted more effectively (with indents appearing as bright spots and the surroundings as shadow) for better image acquisition.

In other instances of applied symbology a diffuse direct illumination may be preferred. Such illumination is typically produced using a direct-projected illumination source (e.g. light emitting diodes (LEDs)) that passes through a diffuser to generate the desired illumination effect.

To take full advantage of the versatility of a camera image sensor, it is desirable to provide bright field, dark field and diffuse illumination. However, dark field illumination must be presented close to a subject to attain the low incidence angle thereto. Conversely, bright field illumination is better produced at a relative distance to ensure full area illumination.

Commonly assigned U.S. patent application Ser. No. 11/014,478, entitled HAND HELD SYMBOLOGY READER ILLUMINATION DIFFUSER and U.S. patent application Ser. No. 11/019,763, entitled LOW PROFILE ILLUMINATION FOR DIRECT PART MARK READERS, both by Laurens W. Nunnink, the teachings of which are expressly incorporated herein by reference, provide techniques for improving the transmission of bright field (high angle) and dark field (low angle) illumination. These techniques include the provision of particular geometric arrangements of direct, bright field LEDs and conical and/or flat diffusers that are placed between bright field illuminators and the subject to better spread the bright field light. The above-incorporated HAND HELD SYMBOLOGY READER ILLUMINATION DIFFUSER further teaches the use of particular colors for improving the illumination applicable to certain types of surfaces. Often, the choice of bright field, dark field, direct or diffuse light is not intuitive to user for many types of surfaces and/or the particular angles at which the reader is directed toward them. In other words, a surface may appear to be best read using dark field illumination, but in practice, bright field is preferred for picking out needed details, especially at a certain viewing angle. Likewise, with handheld readers, the viewing angle is never quite the same from surface to surface (part-to-part) and some viewing angles be better served by bright field while other may be better served by dark field. The above-referenced patent applications contemplate the application of a plurality of illumination types to achieve the best image for a particular surface and viewing angle.

It has been recognized that handheld readers pose a number of unique concerns. At least some of these concerns are shared in relation to fixed readers. For example, the material from which most light pipes are constructed is acrylic (commonly termed "plexiglass"). Acrylic exhibits a high refractive index (approximately 1.58), which is well suited for internal transmission of light down a light pipe. However, acrylic tends to shatter easily in response to impact. This may limit the life and endurance of a handheld reader (particularly a cordless/wireless model) that is expected to occasionally drop and strike a hard floor, perhaps against the light pipe. While the light pipe could be armored with cushioning and external housings, this undesirably increases production costs, weight, obtrusiveness and may optically obscure the pipe.

Moreover, the light pipes described in the above referenced patents may include a chamfered end to project dark field illumination via internal reflection. Refraction through the polished chamfered end also generates direct bright field illumination. The optical clarity of the light pipe and end tends to create a spotlight effect, in which each individual illumination source (red LEDs, for example) is clearly visible on certain surfaces (see FIG. 7 below). This controverts the typical goal of providing an even spread of illumination.

Also, where a conical diffuser is employed to provide an overall source of direct diffuse illumination, prior art devices are limited in their ability to spread light from a few individual illumination sources (LEDs, for example) throughout the diffuser surface, and then onto the subject as diffuse light. Thus, the diffuse light tends to exhibit a characteristic, localized light spot and dark spot effect. Adding further illumination sources to the diffuse section may be limited both by space and the relative cost of illumination sources, particularly where relatively costly blue-colored LEDs are employed.

Further, prior art readers often include visual indicators located at their back, top or another surface that denote the current status of the reader (for example, power on/off, good read, error, bad read, ready, not-ready, etc.). Various information can be presented to the user via different color lights (red/green, for example) and/or via blinking patterns. However, in a production environment, small, rear-mounted or top-mounted indicators may be overlooked or present a distraction while the user tries to focus on the surface being read. A technique for more-conveniently integrating indicators with the user's main point of interest is highly desirable.

SUMMARY OF THE INVENTION

This invention overcomes the disadvantages of the prior art by providing a plurality of novel features that can be applied variously to a reader to improve the illumination performance in both dark field/direct bright field and direct diffuse types of illumination. Further features allow for increased light pipe durability without increasing weight or size and better readability of status indicators by placing such indicators in proximity to the subject and significantly enlarging to overall size of the indicator.

In one embodiment, the light pipe is constructed from durable polycarbonate for increased shock resistance. The chamfered end of the light pipe is textured or frosted to further diffuse refracted light passing through the end so as to present a more even effect. The conical/tapered diffuser within the light pipe is illuminated by a reflector with a white textured surface that reflects a plurality of rearward-directed (opposite the illumination and viewing direction) illumination sources back into the diffuser. The reflector can define a predetermined cross section that directs further light into the forwardmost, remote regions of the diffuser to generate a better overall spread of light and alleviate light and dark spotting effects. The textured surface on the chamfered light pipe end can be employed to better project indicator light. The textured surface can alternatively (or in addition) be applied to the exposed portion of the inner wall adjacent to the distal (forward) end of the pipe.

The illumination sources are arranged in a ring at or near the inner end of the light pipe, and can be multi-colored sources that respond to the controller to project and appropriate color and/or blink in an appropriate pattern to indicate various conditions, such as read success or failure. Typically the controller is adapted to provide these specialized indications between actual image acquisition, so that the image acquisition is properly illuminated. The controller can operate individual portions of the ring so that only corresponding portions of the light pipe perimeter are illuminated in a particular color (quadrants, for example) at a given time. Different quadrants may be simultaneously illuminated in different colors in one example.

In an illustrative embodiment, the light pipe defines a polygonal (for example rectangular) cross section (with the polygon being generally defined as at least four linear or non-linear sides, joined at corners (that may be rounded) to form a (typically) non-equilateral shape. The chamfered edge on each side is at a fixed angle and thus the differing length of the North-South versus East-West sides (in the case of a rectangle), generates two different distances for convergence of dark field rays, which increases depth of field. Stated differently, the polygon (rectangle) includes at least two pairs of opposing sides and the first pair of opposing sides has a length different than the second pair of opposing sides to generate two differing-distance convergence points for dark field rays.

In an alternative embodiment, a mark reader comprises a light transmitter arranged in a surrounding relationship to an interior area, the light transmitter having a proximal end and a distal end. An illumination source is adapted to provide a light for transmission into the light transmitter. The light transmitter distal end includes a first portion and a second portion, the first portion being adapted to allow a portion of the light from within the light transmitter to pass through and out of the distal end to provide bright field illumination, and the second portion being adapted to internally reflect and redirect a different portion of the light to exit at or near the distal end to provide dark field illumination.

In an additional alternative embodiment, a light transmitting assembly for illuminating a mark that is imaged by an image sensor comprises a light transmitter arranged in a surrounding relationship to an interior area, the light transmitter having a proximal end and a distal end. An illumination source is adapted to provide a light for transmission into the light transmitter. The light transmitter distal end includes a chamfered surface and a diffusive surface, the diffusive surface being adapted to allow a first portion of the light from within the light transmitter to pass through and out of the diffusive surface to provide bright field illumination, and the chamfered surface being adapted to internally reflect and redirect a second portion of the light so the at least a different portion of the light exits the distal end to provide dark field illumination.

In yet an additional alternative embodiment, an illumination assembly for a mark reader comprises a light transmitter arranged in a surrounding relationship to an interior area, the light transmitter having an internal wall, an external wall, a proximal end, and a distal end. An illumination source is adapted to provide a light for transmission into the light transmitter. The light transmitter distal end is adapted to allow at least a portion of the light from within the light transmitter to pass through and out of the distal end to provide bright field illumination, and the distal end being adapted to internally reflect and redirect a different portion of the light so the different portion of the light exits the interior wall to provide dark field illumination.

In yet an additional alternative embodiment, an illumination assembly for a mark reader comprises a light transmitter arranged in a surrounding relationship to an interior area, the light transmitter having an internal wall, an external wall, a proximal end, and a distal end. An illumination source is adapted to provide a light for transmission into the light transmitter. The light transmitter distal end comprises a first flat surface and a second flat surface different than the first flat surface, the first flat surface adapted to allow a portion of the light from within the light transmitter to pass through and out of the distal end to provide bright field illumination, and the second flat surface adapted to allow a different portion of the light to pass through and out of the distal end to provide dark field illumination.

In still an additional alternative embodiment, an illumination assembly for a mark reader comprises a light transmitter arranged in a surrounding relationship to an interior area, the light transmitter having a proximal end and a distal end. An illumination source is adapted to provide a light for transmission into the light transmitter. The light transmitter distal end is adapted to allow the light from within the light transmitter to pass through and out of the distal end to provide bright field illumination, and the light transmitter distal end is adapted to allow the light from within the light transmitter to pass through and out of the distal end to provide dark field illumination.

In still an additional alternative embodiment, a method for providing bright field illumination and dark field illumination comprises providing a light transmitter arranged in a surrounding relationship to an interior area, the light transmitter having a proximal end and a distal end; providing an illumination source for providing a light for transmission into the light transmitter; allowing the light from within the light transmitter to pass through and out of the distal end for providing bright field illumination; and allowing the light from within the light transmitter to pass through and out of the distal end for providing dark field illumination.

In yet still an additional alternative embodiment, a method comprises providing a light transmitter and arranging the light transmitter in a surrounding relationship to an interior area, the light transmitter having a proximal end and a distal end; providing an illumination source and arranging the illumination source for providing a light for transmission into the light transmitter; and using a first portion and a second portion of the light transmitter distal end, the first portion allowing a portion of the light from within the light transmitter to pass through and out of the distal end for providing bright field illumination, and the second portion internally reflecting and redirecting a different portion of the light to exit near the distal end for providing dark field illumination.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

The invention description below refers to the accompanying drawings, of which:

FIG. 16 is a schematic diagram of a generalized shape for a rectangular cross section light pipe featuring representations of a North, South, East and West edge;

FIG. 17 is a schematic representation of the convergence of dark field rays from the North and South edges of the light pipe of FIG. 16 showing a first distance thereto;

FIG. 18 is a schematic representation of the convergence of dark field rays from the East and West edges of the light pipe of FIG. 16 showing a first distance thereto;

DETAILED DESCRIPTION OF AN ILLUSTRATIVE EMBODIMENT

Figure 1:
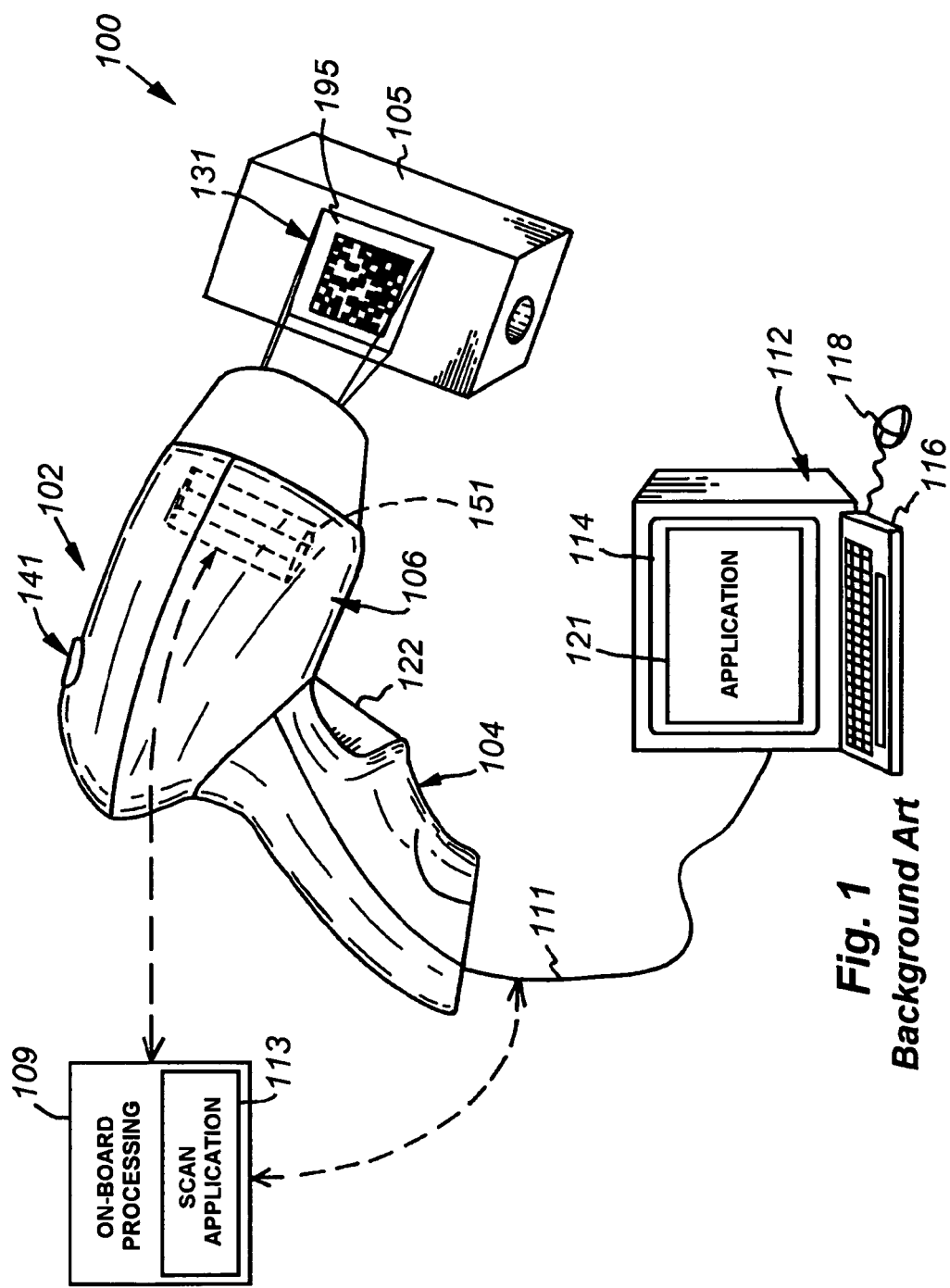
FIG. 1, already described, is a perspective view of a handheld scanning system with integrated illumination according to the prior art.
Figure 2:
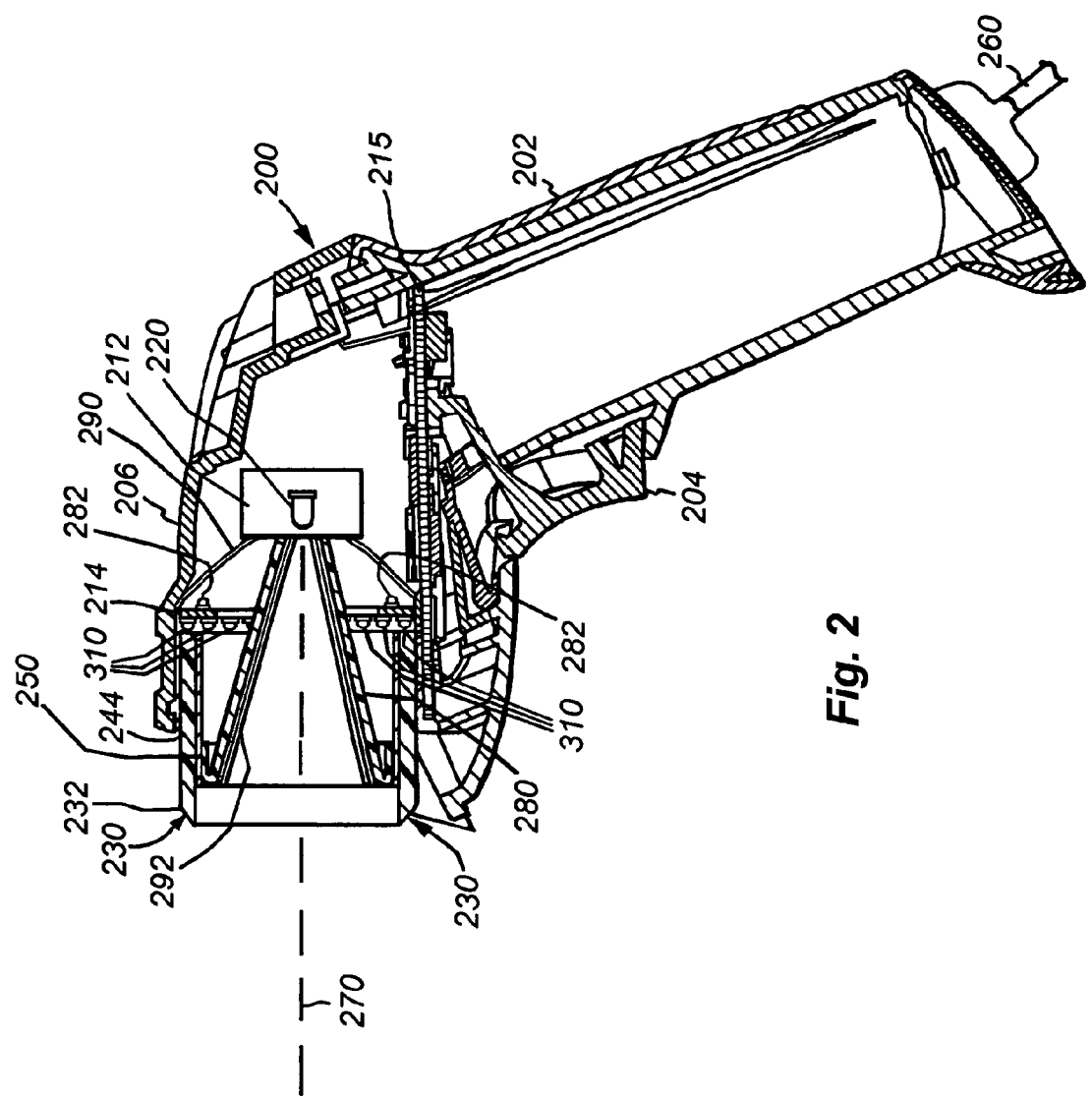
FIG. 2 is a side cross section of a handheld scanning system that can be employed in connection with the teachings of this invention.

FIG. 2 shows a cross sectional side view of an illustrative embodiment of the reader 200 according to the present invention. The imager 212 and an illumination board 214 are positioned on a shock-resistant mounting (not shown) within the housing 206. In this exemplary embodiment, the processor module and related functional electronic components are mounted on a processor board 215. The grip portion 202 and the trigger 204 are functionally cooperative with the housing 206 and components of the processor board 215. The grip portion 206 includes a conveniently placed trigger 204 that can be actuated by a finger of the user to initiate the image acquisition and decoding function. More particularly, pressing the trigger causes all types and colors of illumination (as described further below) to be simultaneously projected onto the subject of interest, and also causes corresponding acquisition of an image by the imager.

With brief reference to the illuminator, the illumination board 214 supports a plurality of LEDs 310 that are red in this embodiment (a variety of colors can be used). The LEDs 310 are directed forwardly, toward the opening of the reader. These LEDs are positioned behind a passive light pipe 244 that internally transmits light from the ring of LEDs 310 to a front end 230. In this embodiment, the front end 230 includes a chamfered surface 232. Various examples of a light pipe for use with a reader or similar application are shown and described in U.S. patent application Ser. No. 10/693,626, entitled LIGHT PIPE ILLUMINATION SYSTEM AND METHOD, by William H. Equitz, et al., the teachings of which are expressly incorporated herein by reference.

Briefly explained, light passes through the extended body of the light transmitter, e.g., light pipe 244, from the sides and/or inner end, adjacent to the LEDs 310. The body is formed from a transmissive/transparent substance. As discussed above, one concern for the light pipe is durability and impact resistance. In an embodiment of this invention, the light pipe is constructed from transparent polycarbonate (available under the trade name Makrolon from BASF of Germany, or alternatively Lexan® available from the General Electric Company). This substance can be injection-molded using a liquid resin that is formed into a desired shape as discussed further below. The transmitted light is reflected internally by the angled/chamfered surface 232 of the light pipe 244 to exit at a low angle toward the center optical axis 270. While acrylic displays a superior refractive index (approximately 1.58), it has been recognized that the refractive index of polycarbonate (approximately 1.49) is sufficient to achieve the degree of light transmission and internal reflection employed for dark field illumination in accordance with embodiments of this invention. All or portions of the inner and/or outer wall surfaces of the light pipe 244 can be coated with opaque paint or another compound to prevent leakage of light into or out of the pipe. In this example, a shield 250 is also provided along the inner surface of the light pipe. One function of the shield 250 is to prevent transmission of diffuse light (described below) in to the light pipe. Another function is to redirect light transmitted from the reflector (see below) back into the diffuser.

In this example, the ring of LEDs 310 acts to produce a red direct bright field effect along with the dark field effect through refraction of some light from the LEDs through the chamfered surface 232. In general, at short reading distances from a surface (<25 mm between the light pipe distal (forward) end 230 and surface), the bright field illumination from the light pipe 230 tends not to interfere with the dark field illumination. The bright field illumination is available, however, for larger reading distances (>25 mm between the end 230 and the surface). This is useful for easy-to-read codes, such as black-and-white printed labels. In alternate embodiments, a separate bright field illuminator can be provided, and as described below. In fact, many available imagers include integral red bright field illuminators. In an alternate embodiment, a separate bright field illuminator can be provided in a discrete color, such as green.

Note that a pair of aiming LEDs 220 (typically emitting green light) are provided. However, these are optional. Such aiming LEDs may be integral with the commercially available image employed herein.

A tether cord 260 provides electrical power to the reader 200, as well as a communication transmission path for the decoded character string of the encoded information, though it is contemplated that the reader 200 can be configured with battery power and wireless communication for complete portable flexibility.

Figure 3:
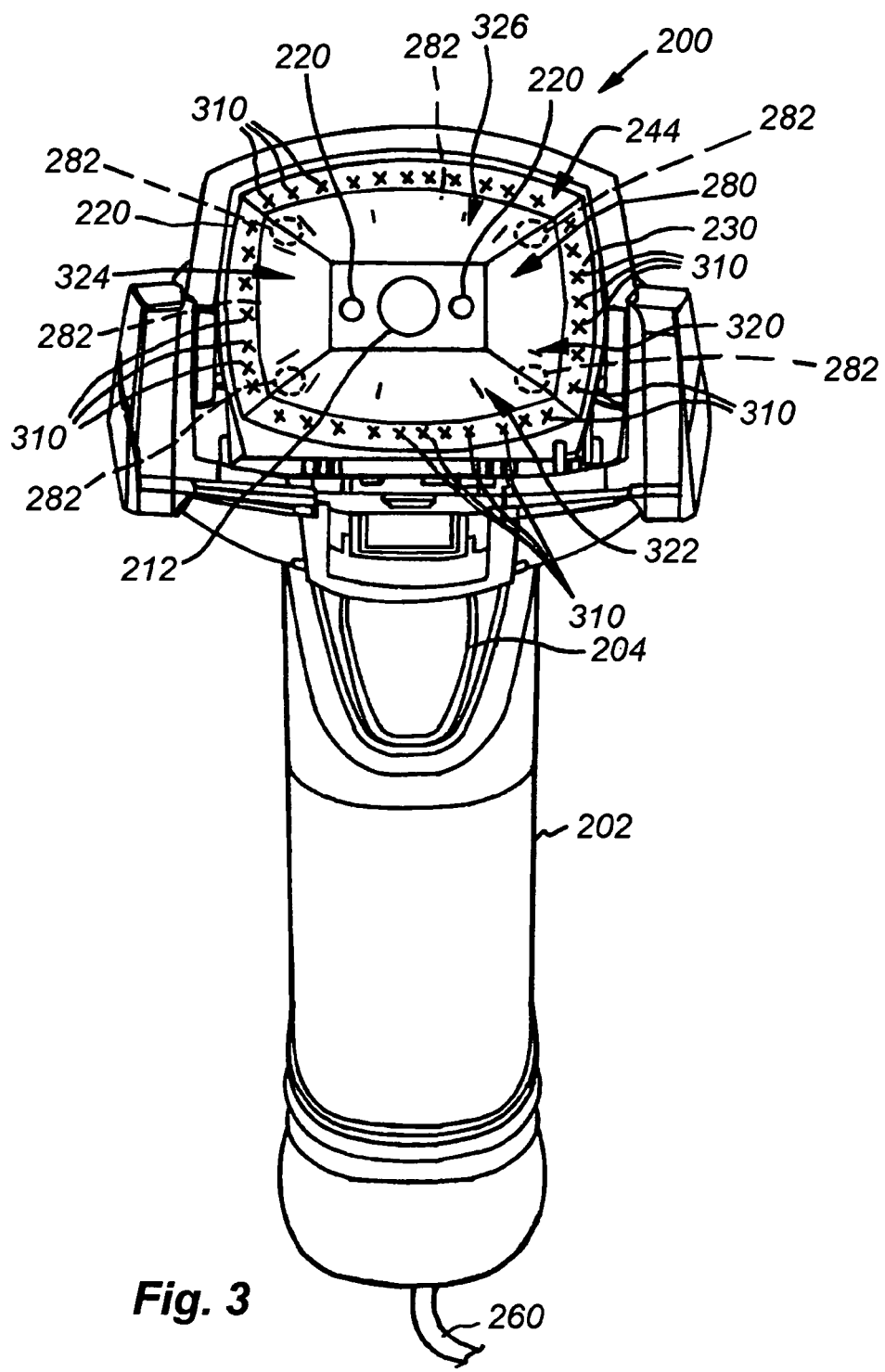
FIG. 3 is a front view of the scanning system of FIG. 2.

With reference also to FIG. 3, a front view of the reader 200 is shown. The distribution and placement of the individual LEDs (or other appropriate light elements) 310 that transmit light to the light pipe 244 is represented by a series of adjacent Xs positioned around the perimeter of the light pipe 244 in line with the distal end 230. The illustrative LED placement creates a generally uniform lighting effect. The placement of these light elements and others used herein is highly variable. In addition, the addressing of light elements can be controlled so that only certain elements are activated at certain times to create the desired overall dark field illumination intensity and/or bias (e.g. lighter on one side than another) to the dark field illumination effect on the subject. This variable-addressing feature is described further below and is discussed in further detail in the above-incorporated U.S. Patent Applications and in other commonly assigned U.S. patent applications referenced therein.

Figure 4:
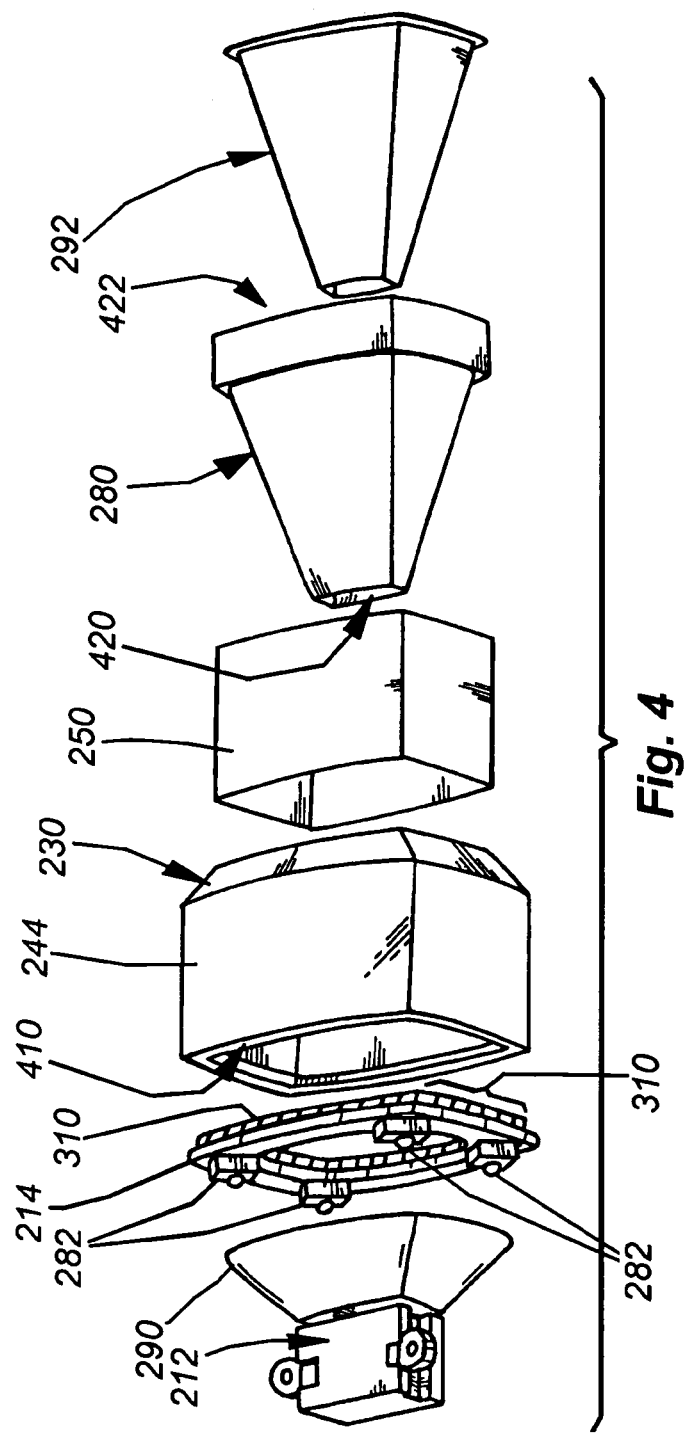
FIG. 4 is an exploded view of the illumination assembly and image sensor for the scanning system of FIG. 2.

Reference is now also made to the exploded view of FIG. 4, which further details the components of the overall illuminator assembly with respect to the imager 212. As 10 shown, the various illuminator assembly components, described above have been separated to reveal individual structural details. The imager 212 resides at the left side of the view. The illumination board assembly 214 is located ahead of it. Placed in front of the illumination board 214 and LEDs 310 is the proximal (or base) end 410 of the light pipe 244, which receives transmitted light from the LEDs 310, and internally transmits it to the chamfered distal end 230. The LEDs 310, or other light elements, may also be placed to transmit light into the light pipe 244 through an exterior wall and/or an interior wall of the light pipe. A tapered (also loosely termed "conical") diffuser 280 (refer also to FIG. 2) is nested within the light pipe 244, with a narrowed proximal opening 420 provided adjacent to the imager 212 and a widened distal opening 422 located at the opposing end. In an illustrative embodiment, this diffuser 280 can be constructed from a thin (1-3 millimeter) polymer material with a frosted/textured interior. As noted above, a thin shield 250 is provided against the interior of the light pipe to block the diffuser's transmitted light from entering the light pipe 244. In this manner, the light emitted from the diffuser does not mix with the light pipe's transmission.

Space may be limited in the region between the shield 250 and the inner surface of the diffuser 280. Moreover, it is contemplated in various embodiments to provide a blue color for the diffuse illumination, employing high-output, blue-colored LEDs, which are more costly than the red or green versions. Thus, use of a smaller number of such LEDs is highly desirable. The fewer individual illumination sources employed, the greater the need to spread the light around the diffuser so as to avoid a light and dark spotting effect on the surface of interest. To accomplish the desired spread of diffuse illumination with a minimal number of individual illumination sources, the light projected by the diffuser is provided by a set of (four) rearward-projecting LEDs 282 mounted on the illumination board 214 on a side opposite the ring of light pipe LEDs 310. These LEDs 282 project rearward into a conical, spherical, parabolic (or other shape) reflector 290 that spreads the reflected light throughout the inner surface of the diffuser 280 so that it exits as a substantially uniform spread of direct, diffuse light onto the surface of interest. As will be described further below, the reflector's shape can be optimized to improve the spread of light along the conical diffuser. In this embodiment, the reflector 290 is constructed from polymer with a white textured surface to further diffuse the light reflected therefrom. This indirect projection of light with a diffusing reflective surface significantly aids in reducing the number of diffuse illumination LEDs 282 employed to project the diffuse illumination, thereby reducing production costs and power consumption. As noted above, in this embodiment, the diffuse illumination LEDs 282 are high-output blue LEDs. However, the particular colors used for each type of illumination are highly variable. However, it is highly desirable that the diffuse illumination be spaced apart on the spectrum sufficiently from the dark field illumination to allow adequate resolution of the two wavelengths of light.

A translucent "conical" filter 292 is provided. The filter 292 is adapted to filter out light with larger wavelengths, thereby allowing smaller wavelength blue light to pass out of the diffuser and onto the surface, but preventing the retransmission of any reflected red light from the surface, which would otherwise tend to become retransmitted as diffuse red light along with the red dark field illumination. The wavelength spread between red light and blue light is sufficient to accomplish this filtering without compromising the performance of either type (dark field/direct bright field versus direct diffuse) of illumination. The filter 292 conforms to the shape of the diffuser's outer (exposed) surface, and can be snapped or adhered onto the diffuser surface using a variety of fastening techniques that should be clear to those of ordinary skill. Note that instead of a separate filter (292), a similar effect can be obtained through the use of a colored diffuser (see FIG. 6 below). The color should be selected so that the diffuser transmits the diffuse light (blue in this embodiment), but does not reflect the dark field light (red in this embodiment) transmitted from the light pipe.

Thus, to summarize, at least two discrete sets of illumination transmitters (LEDs, for example) are provided according to the illustrative embodiment, the direct diffuse transmitters 282 and the dark field transmitters 310. In accordance with the illustrative embodiment, each discrete set of transmitters 282 and 310 generates a corresponding discrete illumination color. For example, direct diffuse illumination can be generated by blue LEDs and dark field (and direct bright field) can be generated by red LEDs. The use of two discrete colors allows each type of illumination to be restricted to its particular application, without mixing, using filtering within the illumination assembly. In this embodiment, each type of illumination creates an image that is received by the imager 212. The imager in this embodiment includes a conventional monochrome sensor that produces a grayscale image from the colored light. Note in alternate embodiments a color sensor can be employed. One such implementation is shown and described in commonly assigned U.S. patent application entitled SYSTEM AND METHOD FOR EMPLOYING COLOR ILLUMINATION AND COLOR FILTRATION IN A SYMBOLOGY READER by Laurens W. Nunnink, and filed on even date herewith, the teachings of which are expressly incorporated herein by reference.

Figure 5:
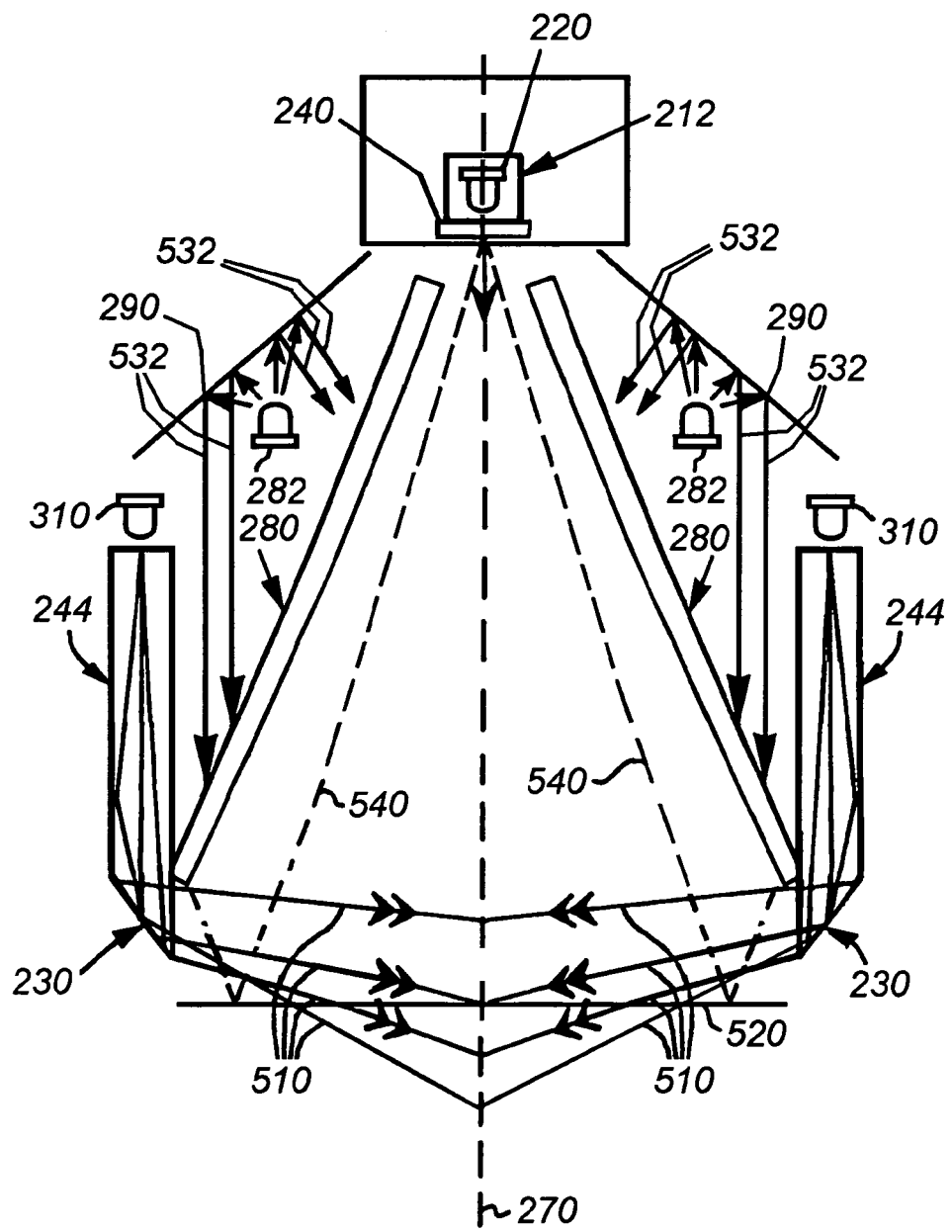
FIG. 5 is a somewhat schematic side cross section of the sensor and illuminator assembly for use with the scanning system of FIG. 2 detailing the path taken by various illumination types.
Figure 6:
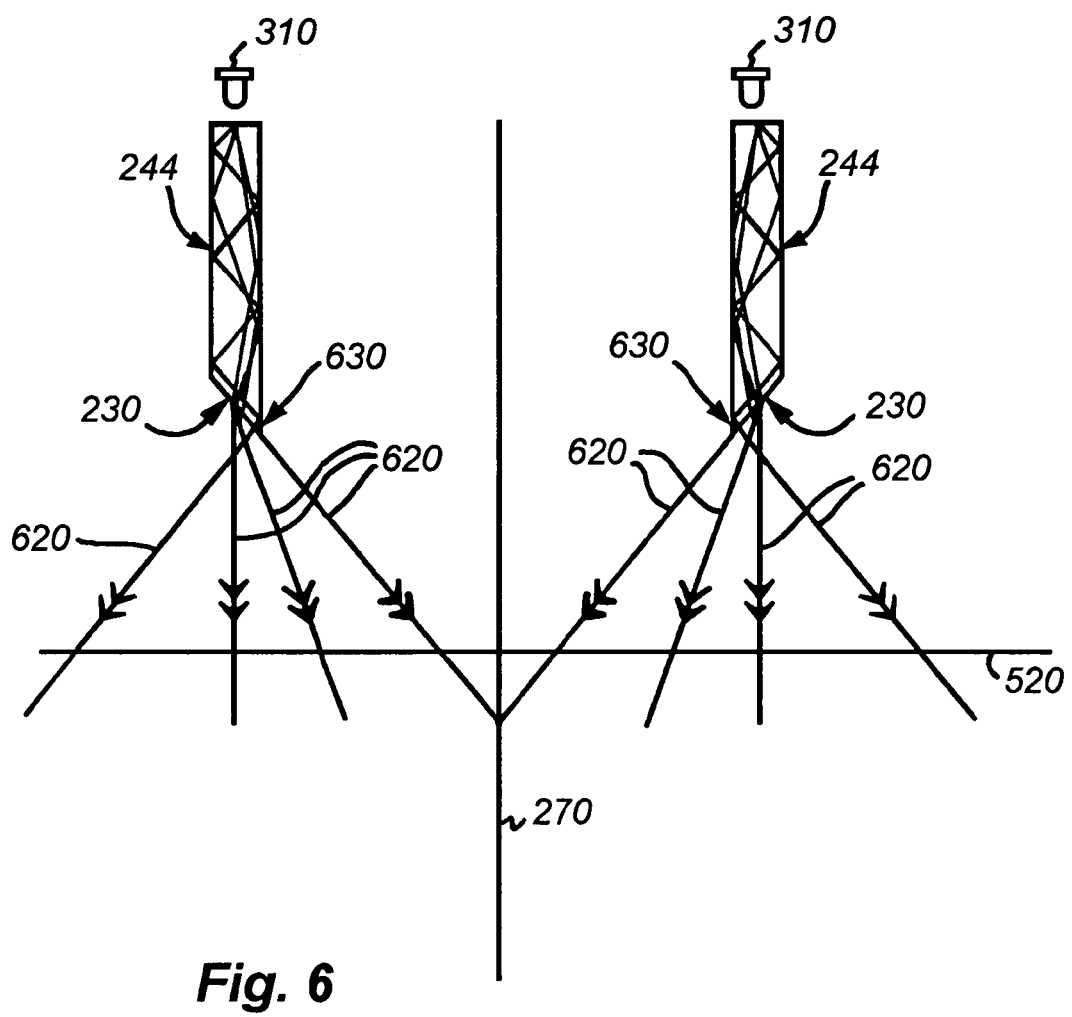
FIG. 6 is a somewhat schematic side cross section of the light pipe of the illuminator assembly of FIG. 5 more particularly showing the projection of direct bright field illumination.

Reference is now made to FIGS. 5 and 6, which describe generally the illumination patterns achieved by the light pipe 244 and diffuser 280 of the illumination assembly. Referring first to FIG. 5, a cross section of an implementation of the diffuser 280 is shown, with light pipe 244 as described generally above, relative to the imager assembly 212 (and associated lens structure 240). Dark field illumination (rays 510) is directed into the light pipe 244 that is internally reflected at the chamfered distal (forward) end 230 to be, thus, directed at the object surface 520 at a low angle. Further information regarding the basic design and implementation of passive light pipes with selectively actuated illumination to provide dark field illumination can be found in the above-incorporated U.S. patent application Ser. No. 10/693,626, entitled LIGHT PIPE ILLUMINATION SYSTEM AND METHOD, by William H. Equitz, et al. Direct illumination (rays 532) from blue LEDs 282 is converted into totally diffuse direct illumination by reflection off the reflector 290, and passage into and through the diffuser 280 of this embodiment. The diffuser 280 thereby projects diffuse illumination on the object surface 520 within the field of view, depicted as the region defined by dashed lines 540. In this embodiment the diffuser 280 is, itself, translucent, without a color tint or color-filtering effect. In alternate embodiments, the diffuser can be tinted to generate a desired color and/or act as a filter (using colored or white illumination sources (282)). It should be noted that the diffuser 280 according to this embodiment, and other embodiments described herein, can be constructed and arranged so as to be removably attached to the hand held scanning appliance. In one example, the diffuser can be removed to allow the transmitters 282 to operate as non-diffuse direct bright field illumination. Alternatively, the diffuser can be provided with movable shutters that selectively expose clear (non-frosted/non-diffusing) windows in the overall diffuser. The removability of the diffuser 280 can be achieved by incorporating snap-fit clearances and/or features in the diffuser and light pipe 244 that permit removable assembly (not shown).

In this embodiment direct non-diffuse bright field illumination (see rays 620 in FIG. 6) is provided by refraction of light through the chamfered end 230 of the light pipe 244. As shown particularly in FIG. 6, a portion of the light internally reflected along the pipe 244 exits directly from the chamfered end 230 as relatively high-angle (usually greater than 45 degrees relative to the surface 520) bright field light (rays 620). The remaining light is internally reflected by the chamfered end 230 to exit adjacent to the inner corner 630 of the pipe 244 as discussed generally above. Note that the light pipe can be modified in alternate embodiments to include a flattened ring (residing in a plane perpendicular to the optical axis 270. This would permit additional bright field light to be directly transmitted onto the surface 520. Likewise, a nested light pipe with a flat (unchamfered) ring formed at its distal end can be used in alternate embodiments for direct transmission of bright field light along a waveguide separate from the depicted dark field light pipe 244. This can be useful where illuminators having a discrete color are used for direct bright field light. Alternatively, where optional direct bright field transmitters are employed they can be located so as to project light through clear/transparent portions (not shown) of the diffuser 280.

While not shown in this illustration for simplicity, it can be assumed that a filter (292 above) may be applied over the diffuser to prevent migration of reflected dark field (and bright field) light into the diffuser 280.

Figure 7:
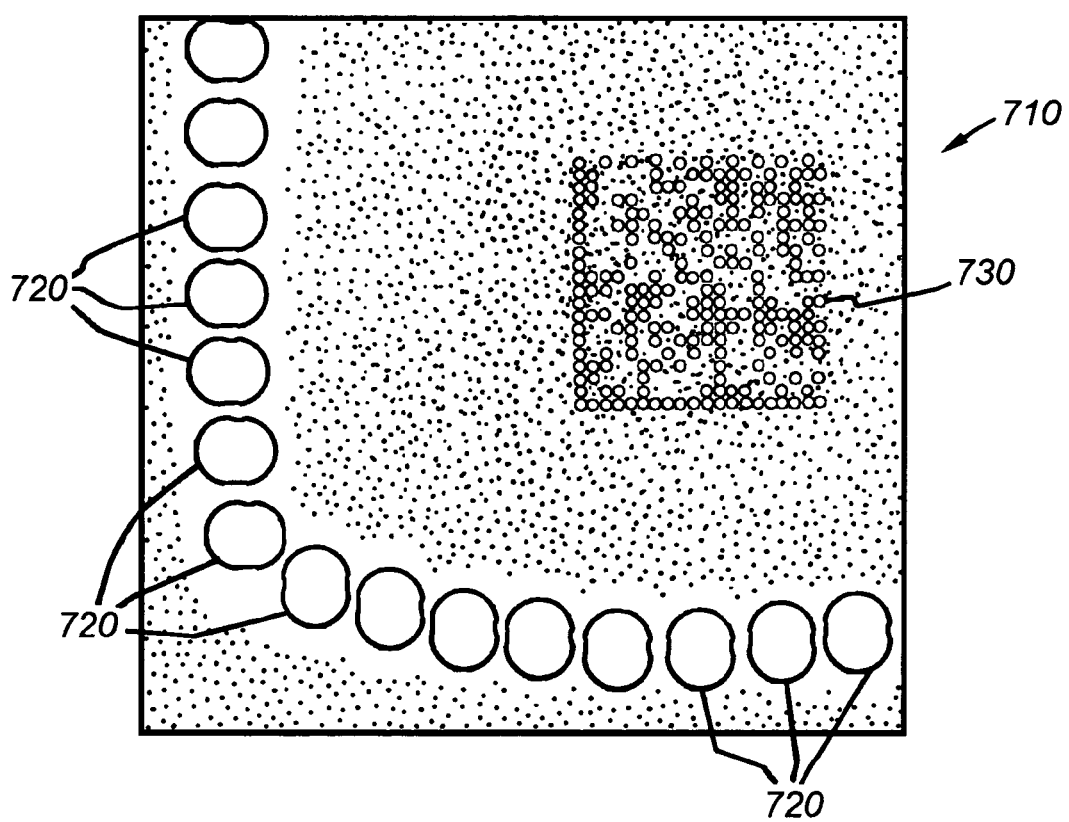
FIG. 7 is a diagram showing an illumination effect in which individual illumination sources are projected onto a surface through a polished chamfered light pipe end.

As discussed in the above Background of the Invention, illuminator light pipes according to various prior implementations of mark readers include a polished distal end. Referring briefly to FIG. 7, an image 710 acquired of a reflective surface using a light pipe with a polished end is shown. This image 710 clearly depicts delineated spots 720 produced by the individual illumination sources in the illumination ring. These spots lead to a somewhat broken illumination pattern that may effect acquisition of the mark 730.

Figure 8:
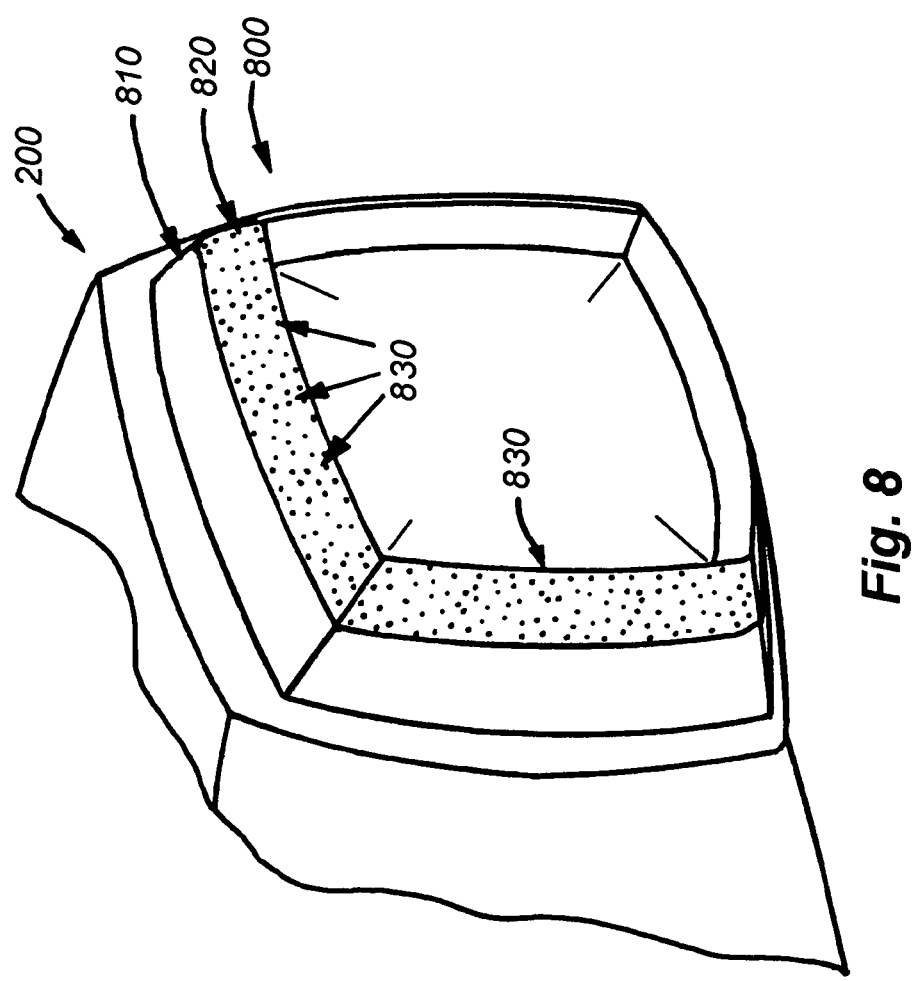
FIG. 8 is a fragmentary perspective view of the viewing end of the reader featuring the illumination assembly and having a textured surface on the chamfered light pipe end.
Figure 9:
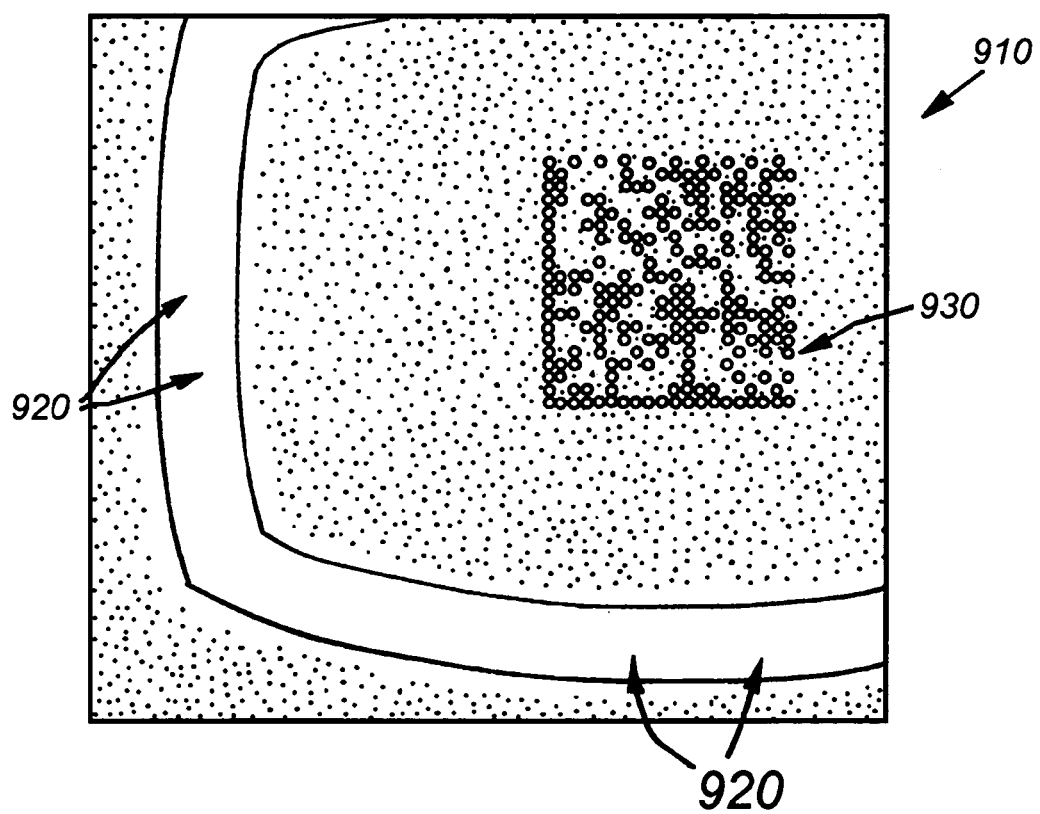
FIG. 9 is a diagram showing an illumination effect achieved on a surface employing a textured chamfered light pipe end in accordance with an embodiment of this invention.

Referring to FIG. 8, the reader 200 is fitted with an illumination assembly 800 that includes a light pipe 810 according to an embodiment of this invention. The light pipe 810 includes a chamfered end 820 about its forward perimeter having a general size and shape as described above. Notably, the depicted outer surface 830 of the chamfered end 820 is finely frosted or textured. This provides a mild diffusive effect to light exiting as direct bright field illumination (see FIG. 6) and also to internally reflected light exiting as dark field illumination. The resulting diffusion generates the image shown in FIG. 9.

Note that the ring of light 920 surrounding the mark 930 is more uniform and the mark, itself, appears better contrasted than the results of the polished-end version shown in FIG. 7.

Figure 10:
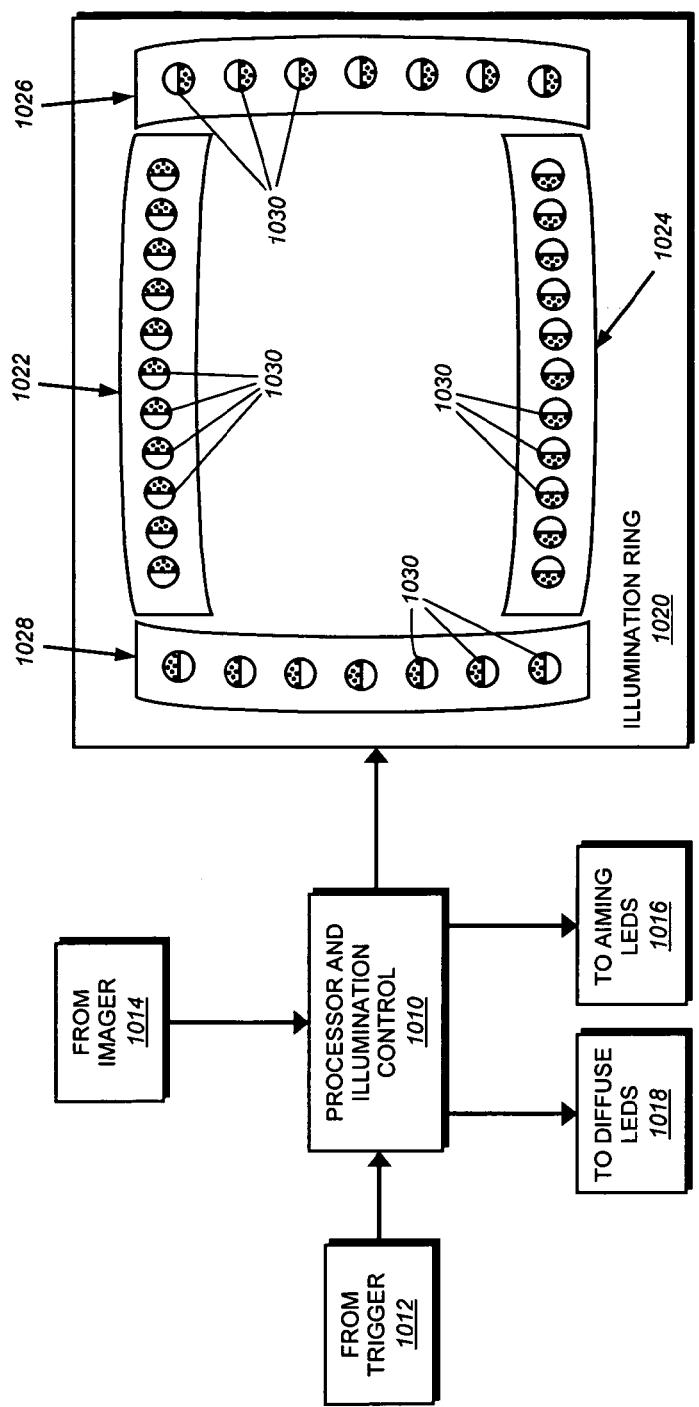
FIG. 10 is a block diagram of the image processor and illumination control circuitry interacting with the sensor, trigger and illumination ring, featuring individual quadrant control and multi-color illumination sources.

The frosted or textured surface 830 provided along the chamfered end facilitates a novel and desirable display of reader status according to an embodiment of this invention. Before describing the status display in detail, reference is made to FIG. 10, which schematically describes the basic components of the illumination and image processing system of the reader. The circuit board (215 in FIG. 2) of the reader includes a processor and illumination controller, shown schematically as processor/control block 1010. The processor/control 1010 can employ conventional image processing and mark-recognition/decoding processes. The processor/control 1010 receives signals from the trigger (block 1012), which are used to operate the illumination assembly and to obtain image date via the imager (block 1014). The aiming LEDs (block 1016 and see also 220 in FIG. 2) are operated before and during image acquisition under control of the processor 1010. These serve to keep the user aimed at the mark during the acquisition process, particularly where the scan is performed at a standoff distance from the object surface. To this end, it is noted that acquisition of the image according to this embodiment involves a stepping through of a plurality of illumination types (dark field and diffuse) in timed sequence, with associated image acquisition of the mark during each type of illumination. Typically the best image (or a combination of the images) is chosen to decode the data represented by the mark. Before acquisition, and after acquisition, the reader may indicate a variety of status codes, such as ready-to-read, read successful, read unsuccessful, etc. These indicators are described further below.

During the stepping process, the processor 1010 directs the illumination ring (block 1020) to illuminate. It then directs the diffuse illuminator (block 1018) to illuminate. As described in various of the above-incorporated-by-reference patent applications, the ring 1020 can include individual banks of LEDs (or other illumination sources) that, in this example, are formed into quadrants—namely top/north 1022, bottom/south 1024, right/east 1026 and left/west 1028 (as viewed from outside, toward the reader front). These quadrants can be individually addressed by the processor. This allows the output of each quadrant to be varied so as to generate the desired effect on the object. This is particularly useful, where the reader may be disposed at a non-perpendicular angle to the object surface or the surface is non-flat. Various automatic adjustment processes can be included to efficiently cycle through various lighting arrangements among the quadrants to determine the arrangement/profile that achieves the best image. In this embodiment, the individual illumination sources (LEDs 1030) are commercially available multi-color LEDs (red and green in this embodiment, denoted schematically by the split line down the middle of each LED 1030), capable of projecting either of two colors in response to the processor 1010. This can be useful, from an imaging standpoint, where a different color is to be provided for dark field and direct bright field. More significantly, the illumination ring's multicolor capability allows the light pipe (particularly the frosted end 820) to project a highly visible, subject-adjacent indicator light in a plurality of colors.

Figure 11:
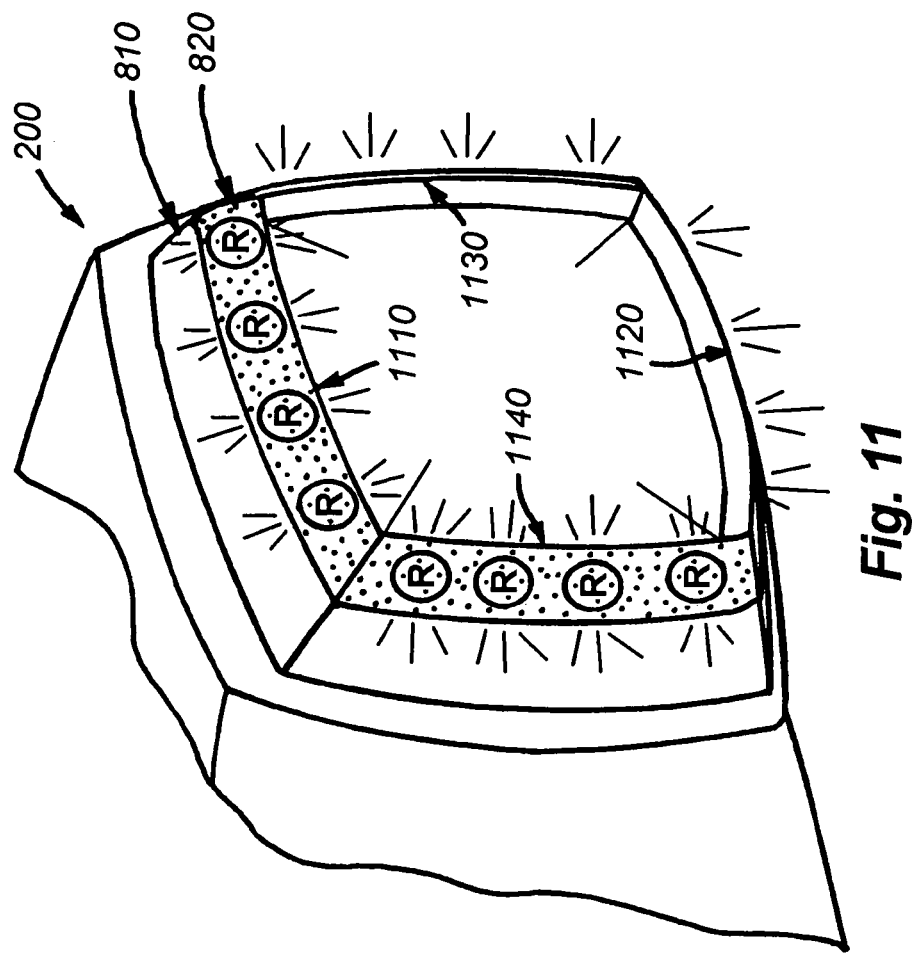
FIG. 11 is a fragmentary perspective view of the viewing end of the reader showing the textured chamfered light pipe end illuminated in red as an indicator.

FIG. 11 details generally the illumination of the light pipe 810 for the purpose of providing the user an indicator. In this example, the four quadrants 1110, 1120, 1130 and 1140 of the textured chamfered edge 820 are illuminated red (denoted by the encircled R's) by their appropriate banks of LEDs in the ring. The frosted surface in fact generates a bright, diffuse color strip that enhances viewing of the indicator. This indicator can be illuminated before, during or after image acquisition as a continuous or blinking signal. Blinks can be timed in the manner of Morse code to achieve a desired status message. It should be clear that providing a large, clearly visible indicator light at the distal end of the light pipe (near to the mark—where the user will have his or her attention focused) affords a highly effective indicator that does not distract the user from the subject at hand and that is visible whether the reader is placed in close proximity to the object surface or at a standoff therefrom. In fact, at standoff distance, the indicator itself projects a colored light onto the surface, further focusing the user's attention on the task at hand.

Figure 12:
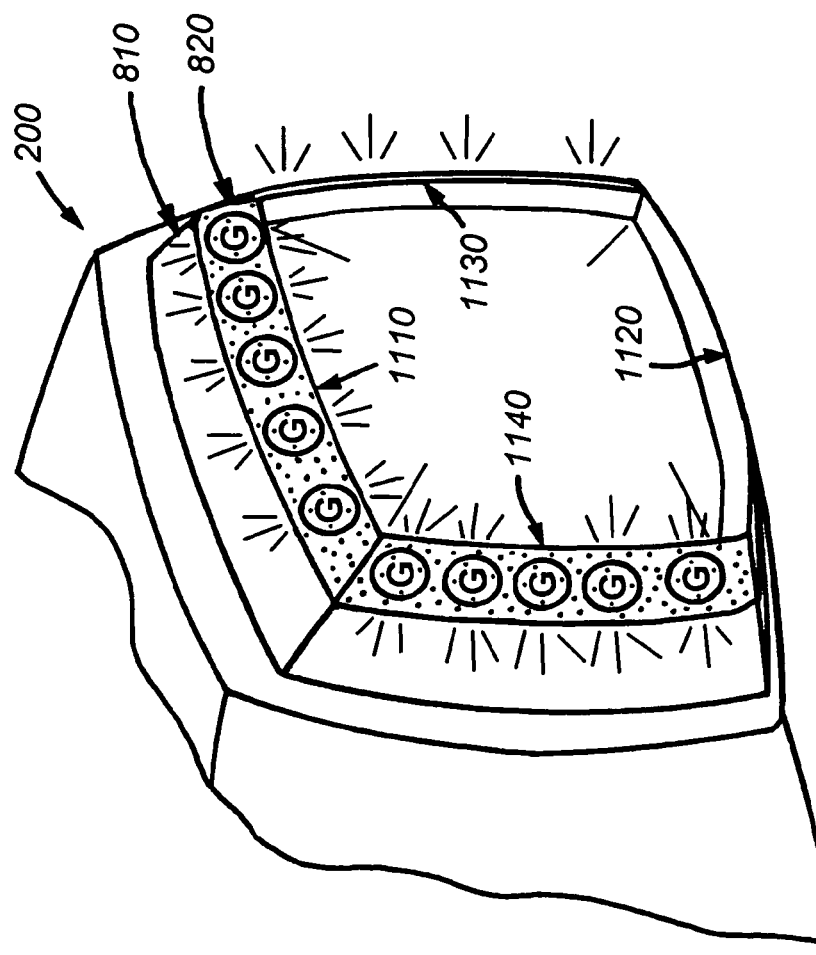
FIG. 12 is a fragmentary perspective view of the viewing end of the reader showing the textured chamfered light pipe end illuminated in green as an indicator.

As shown in FIG. 12, all light-pipe-end quadrants 1110, 1120, 1130, 1140 are illuminated in green (denoted by the encircled G's). This can be a solid (continuously green) or blinking indicator. It can also blink alternatively with red (or another color) according to any predetermined pattern to provide a particular message.

Figure 13:
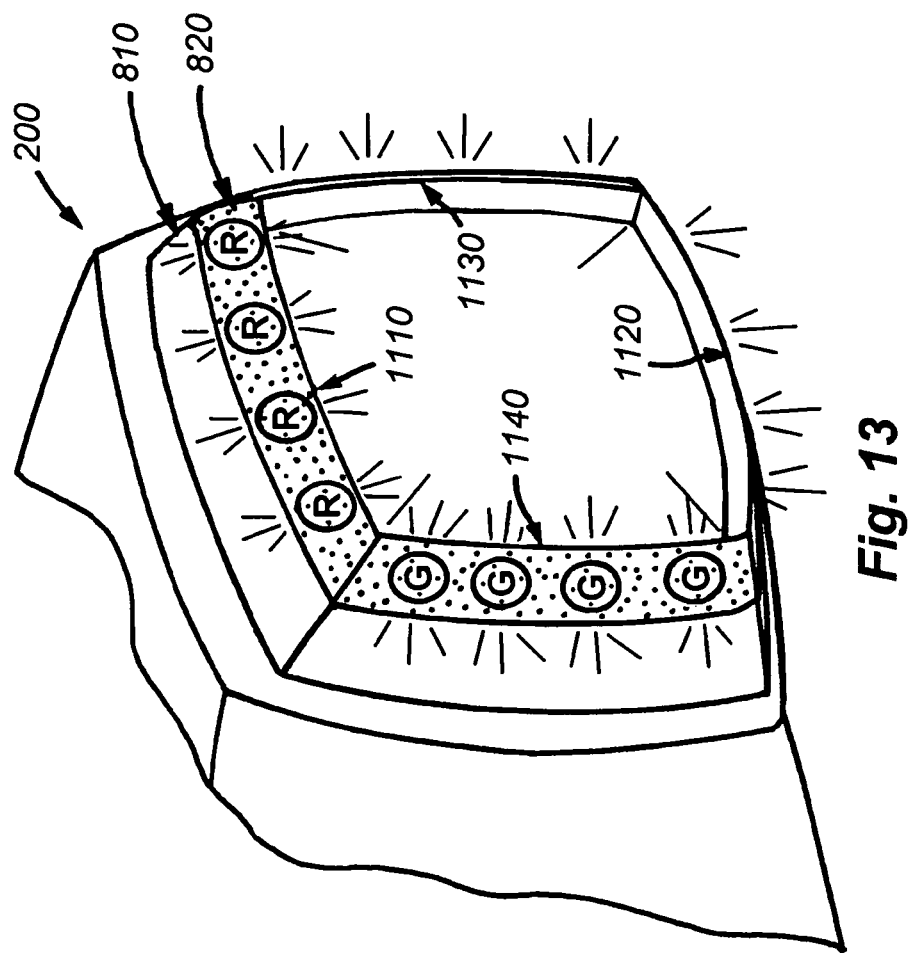
FIG. 13 is a fragmentary perspective view of the viewing end of the reader showing the textured chamfered light pipe end illuminated in red in predetermined quadrants and green in other predetermined quadrants as an indicator.

As shown in FIG. 13, the indicator is characterized by two (or more) simultaneous colors displayed by different quadrants (or other sections) of the light pipe edge. In this example, the top quadrant 1110 is red and the left quadrant 1140 is green. The opposed bottom and left quadrants 1120 and 1130, respectively, may also be red and green. This pattern may blink, or alternate (e.g. red and green switch). Likewise, a unique rolling change of colors may occur in which each quadrant, in turn changes to a different color so that the color change appears to migrate around the perimeter. Any observable and desirable shift of colors is contemplated as an indicator according to this invention.

Figure 14:
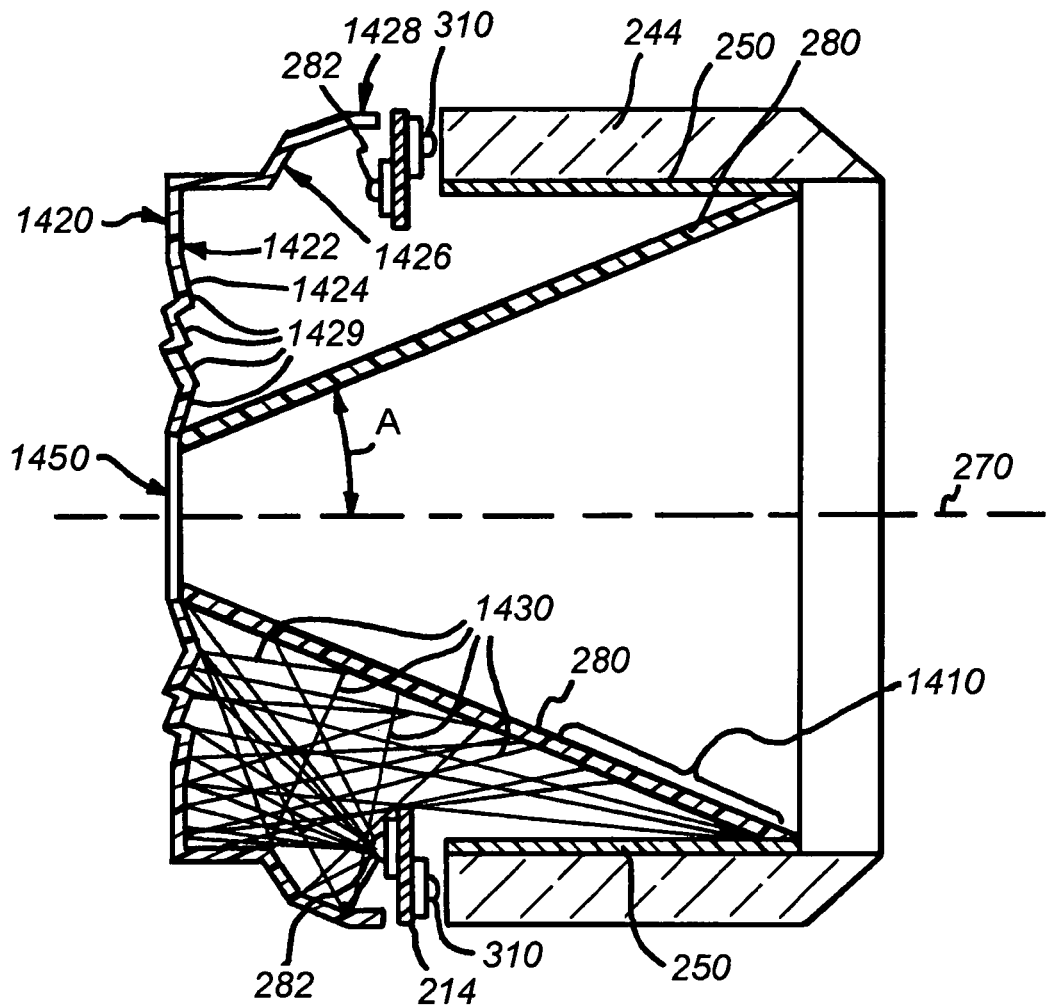
FIG. 14 is a schematic side cross section of the, light pipe, diffuser, illumination sources and reflector showing a predetermined reflector geometry so as to increase projection of light along remote regions of the diffuser.

Reference is now made to FIG. 14, which shows a variation of the above-described reflector shape. As discussed above, the length and angle (A) of the conical diffuser 280 (typically less than 45 degrees with respect to the axis 270 in each quadrant) defines a remote, distal region 1410 between the interior wall of the diffuser 280 and the shield 250 that is small in volume and difficult for light from the reflector 1420 to fill adequately. The gap between the inner perimeter of the illumination board 214 and the interior wall of the diffuser further obscures transmission of light into this remote region 1410. Thus, the reflecting surface 1422 of the reflector 1420 of this embodiment includes a plurality of steps 1424, 1426, 1428, 1429 which are designed to direct specific portions of the reflected light (rays 1430) from the LEDs 282 toward the various parts of the diffuser, including the remote regions 1410. Not that, adjacent to the central window 1450 in the reflector (through which the imager views the subject), the plurality of small, angled steps 1429 formed in the cross section are particularly adapted to transmit rays 1430 from the light sources 282 to various points along the remote region 1410 for an optimized spread of light along the entire diffuser surface. The reflector 1420 in this embodiment also includes a textured surface and a white surface color for maximum diffusion. In alternate embodiments, a different surface color and surface finish can be employed. In this manner a more-uniform illumination of the complete diffuser surface is achieved, and the presence of light and dark spotting on the object is minimized.

While a stepped reflector 1420 is shown and described according to an embodiment of this invention, it is expressly contemplated that reflectors having a variety of surface cross-sectional profiles can be employed in alternate embodiments. Such reflectors should be adapted, using optical-focusing techniques, to spread light along the length of a tapered or conical diffuser of a shape generally contemplated herein so as to avoid undesirable spotting on localized regions of the surface of interest.

Figure 15:
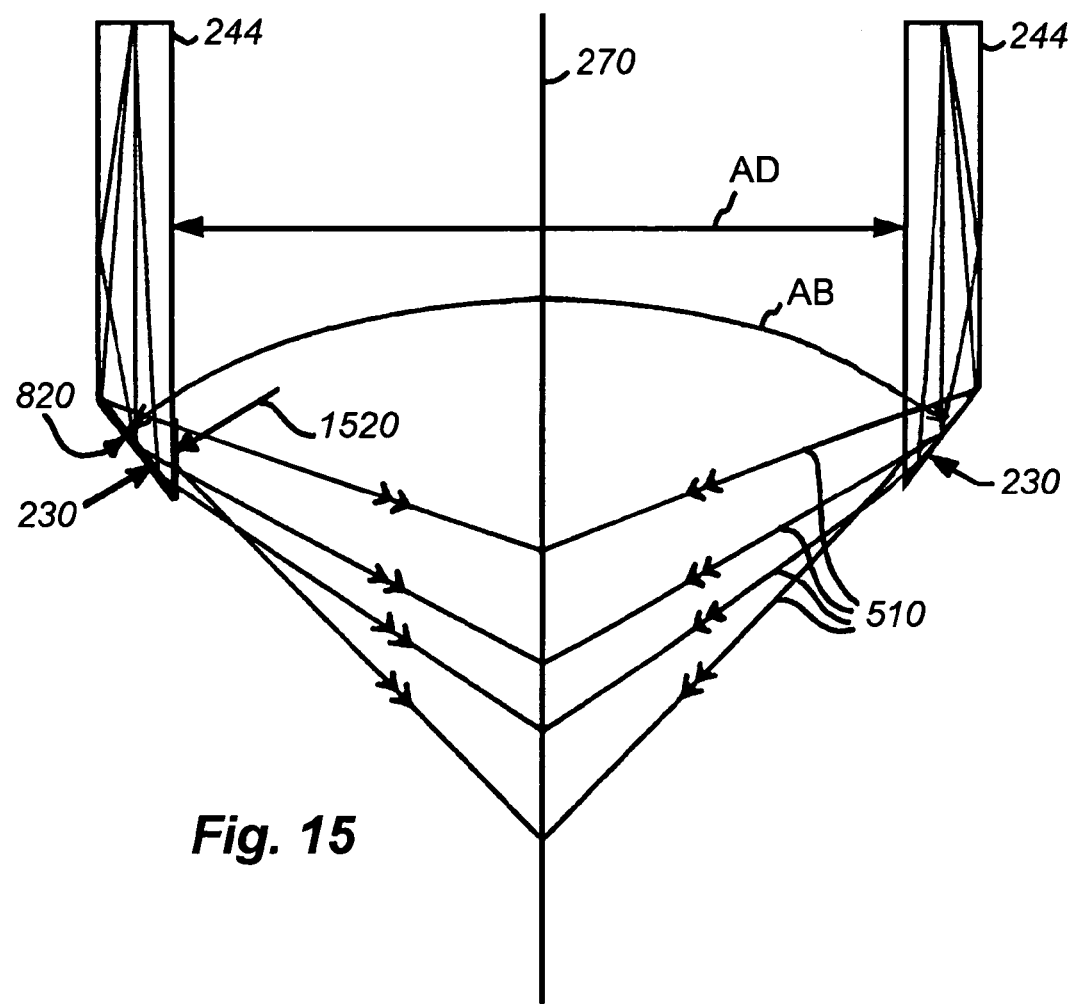
FIG. 15 is a somewhat schematic side cross section of the light pipe of the illuminator assembly detailing the draft angle provided to allow molding of the light pipe and showing an alternative placement of the diffusive surface at the distal end of the light pipe.

It is contemplated that a light pipe with a textured or frosted chamfered end according to the various embodiments of this invention can be produced by a variety of techniques including grit blasting or peening of a finished surface, a desirable construction technique entails molding of the light pipe from poured resin. The chamfered end is located near the bottom of the mold and the rearward end (adjacent to the illumination ring) is located at the top of the mold, at which location the finished pipe is ejected from the mold. The bottom of the mold is provided with a frosted or textured pattern so as to form this surface effect on the chamfered end of the finished pipe. Referring to FIG. 15 which shows the cross section of the light pipe 244 the mold is constructed with a slight draft angle that tapers, so that the resulting light pipe 244 defines a pair of inner walls having a draft angle AD therebetween of approximately at least 2 degrees (each side being 1 degree relative to the axis 270). Because the mold includes a frosted/textured surface, the draft angle is set at approximately 2 degrees, rather than the typical 1 degree for a smooth molded part. This 2-degree draft angle better overcomes the possible adhesion effects created between the finished pipe and the textured mold surface. This draft angle is employed where the texture is applied to the chamfered ends 230. Note that the chamfered ends 230 each define therebetween an angle of approximately 70 degrees (each end being approximately 35 degrees relative to the axis 270). It should be clear, however, that the techniques used for forming the light pipe and other components herein can vary within the scope of ordinary skill.

Referring further to FIG. 15, according to an alternate embodiment, the frosted or textured finish can be applied to the inner wall of the light pipe 244 at the end location 1520. This location 1520 is exposed beyond the distal end of the diffuser 280 and shield 250 described above to allow unobstructed passage of dark field light (rays 510). This causes the reflected dark field light to pass through a diffusive structure prior to striking the mark surface. Note that the textured surface can also be applied to the outer side (location 820) in an embodiment of the invention. Alternatively, the textured surface may be selectively applied to only one of the inner location (1520) or outer location (820) as appropriate. It should be noted that, when applying texture to the interior wall at location 1520, the draft angle AD (FIG. 15) would typically be greater than 2 degrees. An appropriate draft angle can be determined by those of skill in the molding plastic parts.

According to the embodiments described above, the general cross sectional perimeter shape of the light pipe is rectangular (taken on a plane through axis 270). For the purposes of this description, the term "rectangular" shall include minor deviations of the sides of the rectangle from a straight-line geometry. In other words, a rectangular shape herein may include, for example, curvilinear arcs as shown and described. In general, the term rectangular shall be defined generally as a set of linear of non-linear sides that intersect at each of four corners (that may be significantly rounded corners) that cause the approximate direction of two adjacent sides to vary by approximately ninety degrees. A highly generalized representation of a rectangular light pipe 1610 is shown in FIG. 16. As described above, the sides 1620, 1622, 1624 and 1626 of the rectangular light pipe 1610 can be defined in terms of North (arrow N), South (arrow S), East (arrow E) and West (arrow W). Likewise, each edge of the distal, chamfered end can be correspondingly represented as EN (edge North), ES (edge South), EE (edge East) and EW (edge West). The length LNS between the North edge EN and South edge ES is shorter (in this embodiment) that the length LEW between the East edge EE and West edge EW (LNS<LEW). Note that in alternate embodiments the reverse may be true (LNS>LEW) or is these measurements can be approximately equal.

Referring to FIGS. 17 and 18, the chamfered edge along each side is disposed at the same fixed angle (approximately 55 degrees in this embodiment), generating dark field light rays that converge at point 1710 at an average fixed angle .theta. of approximately 32 degrees (representing half the chamfer angle along with an induced draft angle of 1 degree and further refraction as the light exits the pipe interior wall). Since the distance LNS is less than the distance LEW, the convergence distance of light DNS for the pair of opposing sides EN and ES is less than the convergence distance DEW of light from the pair of opposing sides EE and EW. Thus this arrangement affords a wider depth of field for the reader by providing two differing distance ranges of illumination for the mark. In an embodiment of this invention the approximate length NS is 3 cm, the approximate length EW is 4.5 cm. DNS is approximately 0.92 cm, while DEW is approximately 1.23 cm. Thus a desirable difference of more than 0.31 cm is provided for greater depth of field.

Besides providing a larger depth of field with two projection distances, the above-described rectangular light pipe shape presents several advantages over round light pipes and those of other regular, equilateral shapes. The rectangular shape more closely conforms to the conventional 4:3 horizontal-to-vertical ratio exhibited by commercially available sensors. The rectangular cross section yields a larger dark field range than provided by round pipes. It also allows for a lower-profile reader, in terms of overall height. Moreover, the use of discrete "sides" on the pipe makes it easier to control separate quadrants, as described above.

Figure 19:
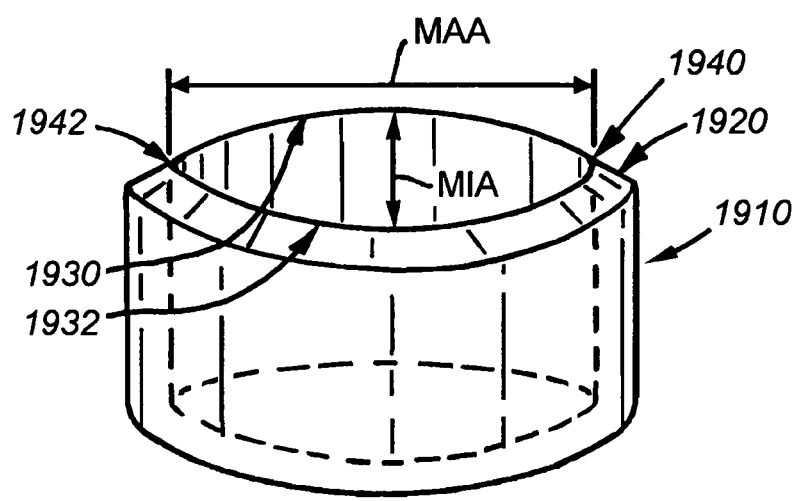
FIG. 19 is an exposed perspective view of a light pipe according to an alternate embodiment of this invention defining an elliptical cross section.

Note that, while the embodiments described herein generally contemplate somewhat polygonal shapes with adjacent sides connected by corners, it is expressly contemplated that continuously curving joints between "sides" can be provided. As such the terms "sides" and pair of opposing sides should be taken to include ellipses in which the opposing sides spanned by the major axis are greater in length that the opposing sides spanned by the minor axis. In this manner each set of sides generates an average convergence distance for dark field rays that is different, thereby producing the desired enhanced depth of field. To this end, FIG. 19 details an elliptical cross section light pipe 1910 that can be adapted for use with an embodiment of the invention (with appropriate reshaping of the illumination ring and diffuser, where applicable. The distal end of the light pipe 1910 terminates in a chamfered end 1920 having an angle and function as generally described herein. The edge of the chamfered end, in essence defines an opposing pair of North and South sides (1930 and 1932, respectively) and East and West sides (1940 and 1942, respectively), which are separated by distances that differ. In this case the distances are the minor axis MIA and the major axis MAA (respectively) of the ellipse. In this embodiment, the "sides" can be characterized as continuously running into each other with arbitrary boundaries or with "continuously curving corners." A variety of variations on this basic elliptical shape are expressly contemplated. In any case, the sides generate at least two discrete distances of ray convergence for a given fixed chamfer angle.

While at least some of the embodiments described herein generally contemplate a light pipe configuration with a textured or frosted chamfered distal (forward) end 230 according to the various embodiments of the invention, the distal end 230 may take on a variety of shapes and surface configurations. For example, FIGS. 20 through 31 show a variety of light transmitters having a distal end 230 that includes a variety of shapes and surface configurations that may be used with the present invention to provide one or more of dark field illumination, bright field illumination, and/or diffuse illumination. As non-limiting examples, the distal end 230 may include a shape or shapes described as flat, rounded, curved, arcuate, angled, grooved, stepped, chamfered, and/or any combination of these and other configurable distal end shapes. In addition, the distal end 230 may include no surface treatments or one or more surface treatments. For example, one portion or multiple portions of the distal end 230 may have a surface texture (e.g., polished, frosted), or a surface covering or optical coating (e.g., painted, silver coated, dielectric, mirrored), and may include additional materials with optic properties, e.g., opaque materials, one or more lenses (convex and/or concave) and/or mirrors, and/or any combination of these and other configurable distal end surface treatments, to provide surfaces with diffractive, diffusive, refractive, and/or reflective properties, as non-limiting examples.

Figure 20:
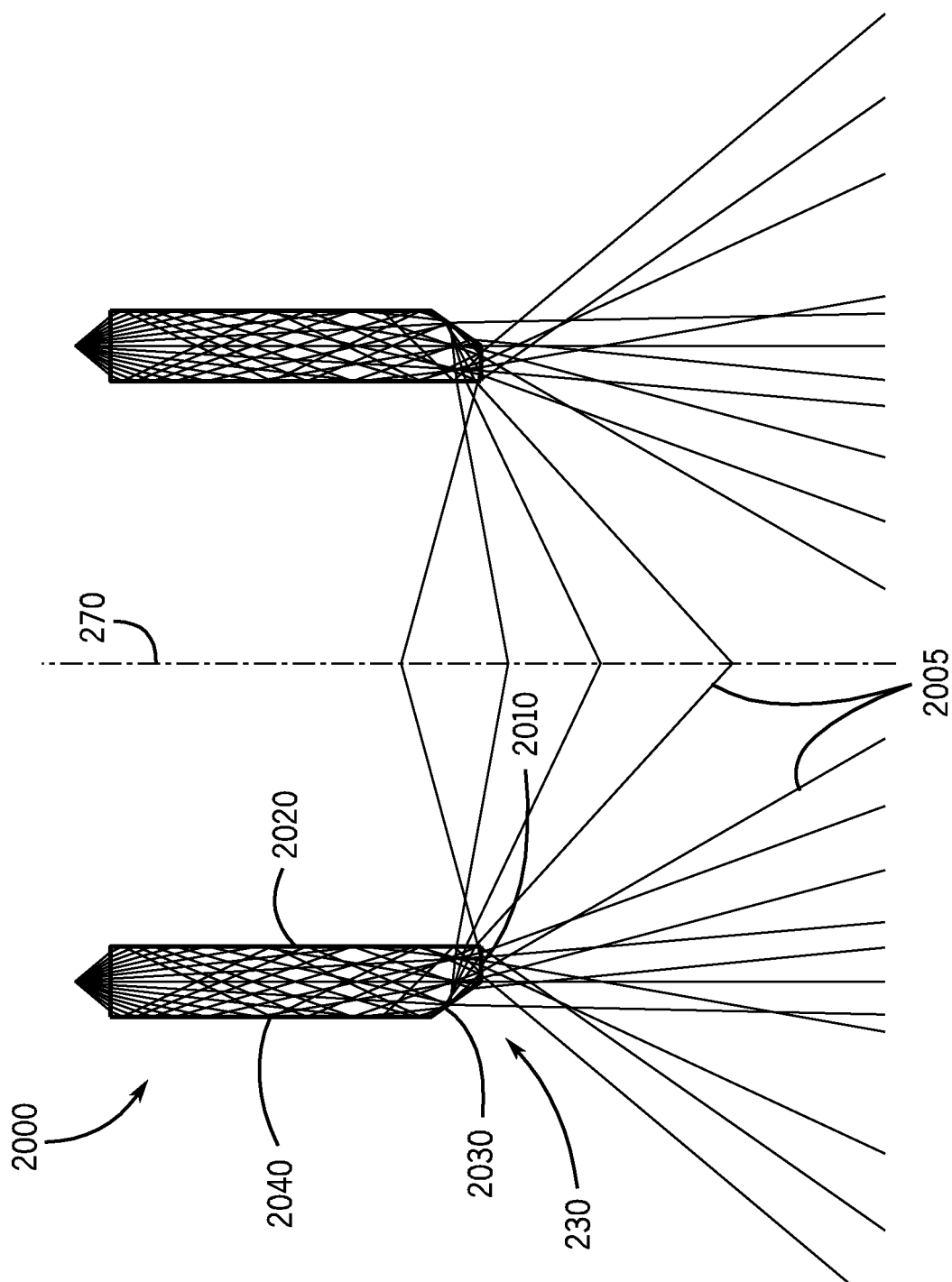
FIGS. 20-30 are schematic side cross sections of a portion of a light pipe of the illuminator assembly showing alternative configurations of the distal end of the light pipe.

To this end, FIG. 20 details an alternative embodiment of the distal end 230 of the light pipe 2000. As can be seen, the distal end 230 includes two generally planar surfaces (although more or less are contemplated, see FIGS. 22 and 27, as non-limiting examples). A bottom surface 2010 is shown to be generally perpendicular, although not required, to the inside surface 2020 of the pipe 2000, and a chamfered surface 2030 extends between the bottom surface 2010 and the outside surface 2040. The chamfered surface may be at a predefined angle to the outside surface 2040, such as between zero and ninety degrees. In one embodiment, the bottom surface 2010 may be a diffusive surface, and the chamfered surface 2030 may be a polished surface. The transmitted light 2005 may be reflected internally by the chamfered surface 2030 of the light pipe 2000 to exit bottom surface 2010 and/or inside surface 2020 at a low angle as dark field illumination. The light pipe 2000 may produce a direct bright field illumination effect along with the dark field illumination through refraction of some of the transmitted light through either or both the chamfered surface 2030 and the bottom surface 2010.

Figure 21:
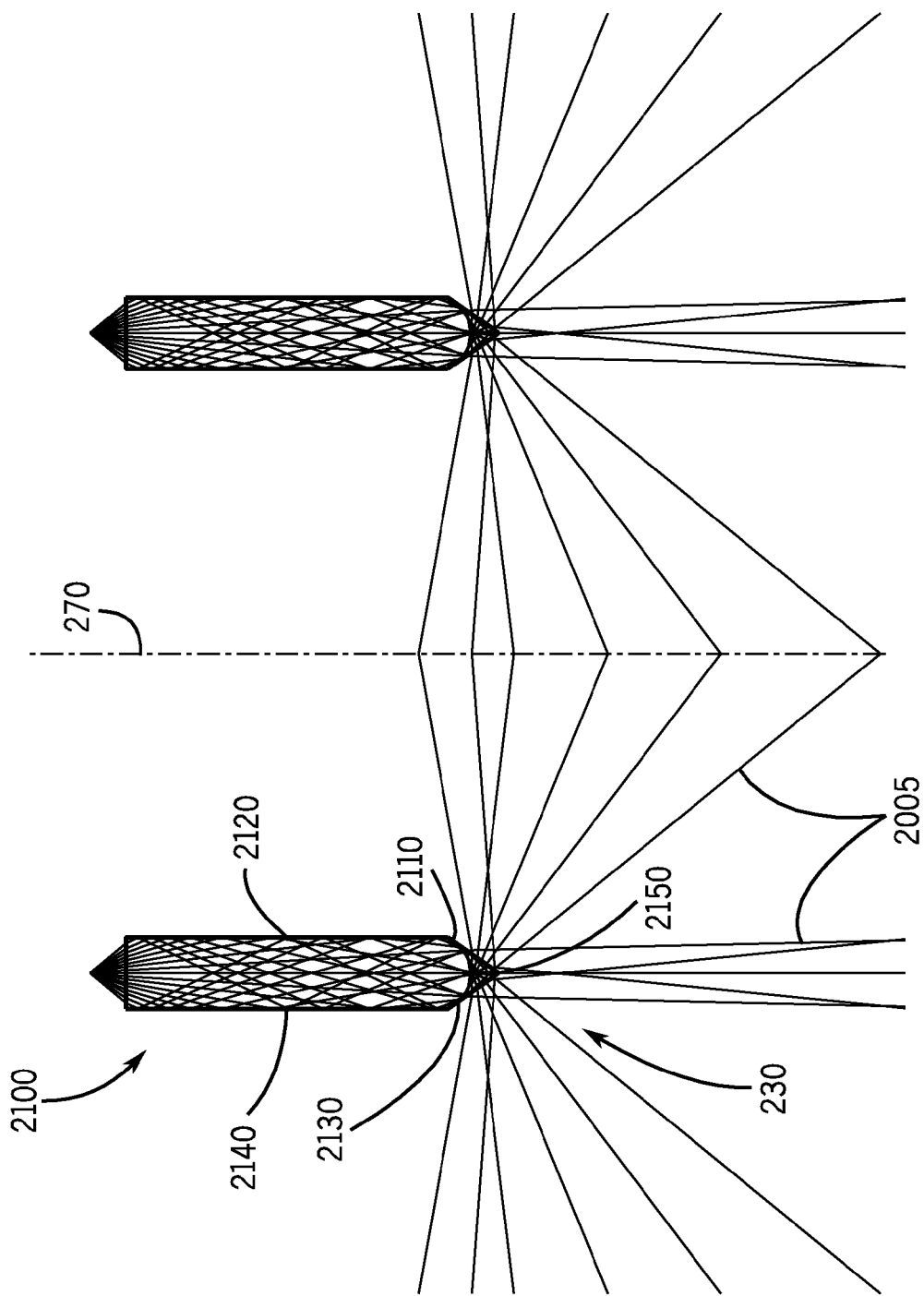

FIG. 21 details an additional alternative embodiment of the distal end 230 of the light pipe 2100. As can be seen, the distal end 230 includes two generally planar surfaces. A first chamfered surface 2110 is shown to be generally perpendicular to and have the same length as, although not required, a second chamfered surface 2130. The first chamfered surface 2110 extends from the inside surface 2120 of the pipe 2100, and the second chamfered surface 2130 extends from the outside surface 2140 of the light pipe (i.e., the second chamfered surface 2130 extends between the outside surface 2140 and the first chamfered surface 2110). The first chamfered surface 2110 and the second chamfered surface 2130 converge at tip 2150. Both the first and second chamfered surfaces may be at predefined angles to the inside 2120 and outside 2140 surfaces, respectively, such as between zero and ninety degrees. In one embodiment, the first chamfered surface 2110 may be a diffusive surface, and the second chamfered surface 2130 may be a polished surface. The transmitted light 2005 may be reflected internally by the second chamfered surface 2130 of the light pipe 2100 to exit the first chamfered surface 2110 at a low angle as dark field illumination. The light pipe 2100 may produce a direct bright field illumination effect along with the dark field illumination through refraction of some of the transmitted light through either or both the first chamfered surface 2110 and the second chamfered surface 2130.

Figure 22:
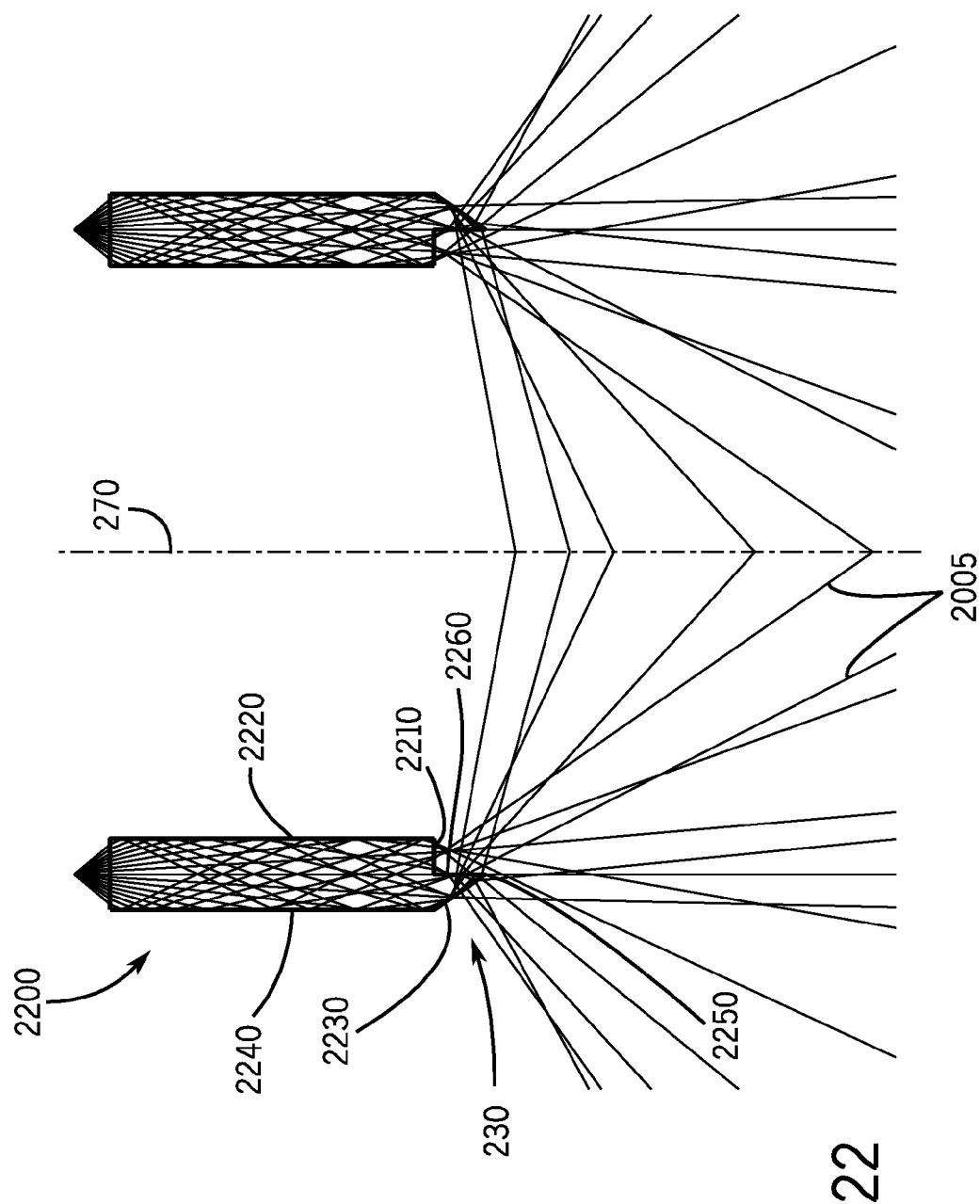

FIG. 22 details an additional alternative embodiment of the distal end 230 of the light pipe 2200. As can be seen, the distal end 230 includes three generally planar surfaces. A bottom surface 2210 is shown to be generally perpendicular, although not required, to the inside surface 2220 of the pipe 2200. A chamfered surface 2230 extends between surface 2260 and the outside surface 2240. Surface 2260 is shown to be generally perpendicular, although not required, to the bottom surface 2210. The chamfered surface 2230 and surface 2260 converge at tip 2250, and surface 2260 and bottom surface 2210 converge at corner 2270. The chamfered surface 2230 may be at predefined angles to the outside surface 2240, such as between zero and ninety degrees. In one embodiment, the bottom surface 2210 may be a diffusive surface, the chamfered surface 2230 may be a polished surface, and surface 2260 may be a diffusive surface. The transmitted light 2005 may be reflected internally by the chamfered surface 2230 of the light pipe 2200 to exit surface 2260 at a low angle as dark field illumination. The light pipe 2200 may produce a direct bright field illumination effect along with the dark field illumination through refraction of some of the transmitted light through the chamfered surface 2230, surface 2260, and/or the bottom surface 2210.

Figure 23:
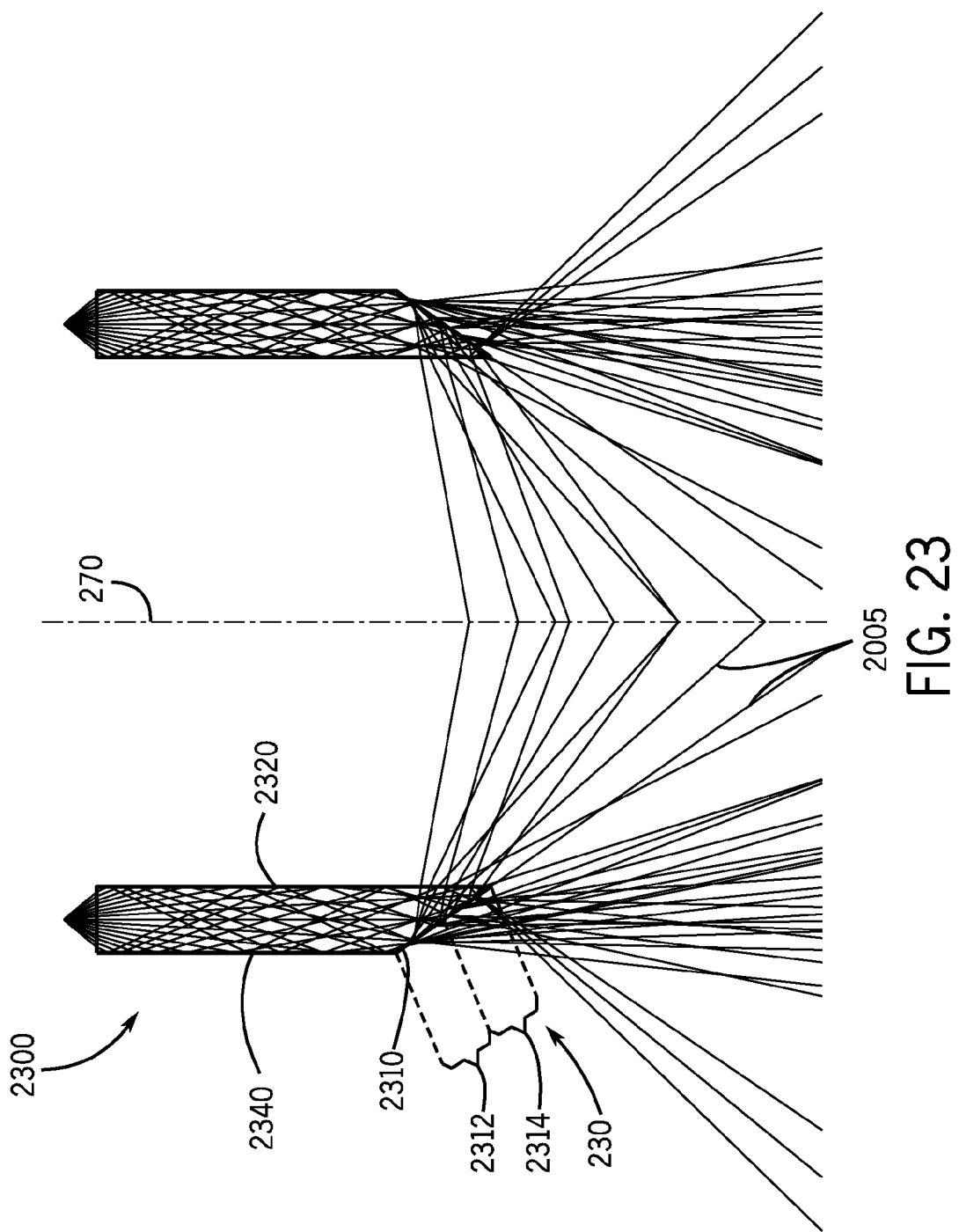

FIG. 23 details an additional alternative embodiment of the distal end 230 of the light pipe 2300. The distal end 230 is similar in configuration to the distal end of light pipe 244 previously described in that it includes a chamfered surface 2310 extending between the inside surface 2320 and the outside surface 2340. As previously described, the chamfered surface may be at a predefined angle to the outside surface 2340, such as between zero and ninety degrees. In one embodiment, the chamfered surface 2310 may include more than one surface treatment. As a non-limiting example, the chamfered surface 2310 may include both a diffusive portion 2312 and a polished portion 2314. The transmitted light 2005 may be reflected internally by the polished portion 2314 of the light pipe 2300 to exit inside surface 2320 at a low angle as dark field illumination. The light pipe 2300 may produce a direct bright field illumination effect along with the dark field illumination through refraction of some of the transmitted light through the diffusive portion 2312 and/or the polished portion 2314.

Figure 24:
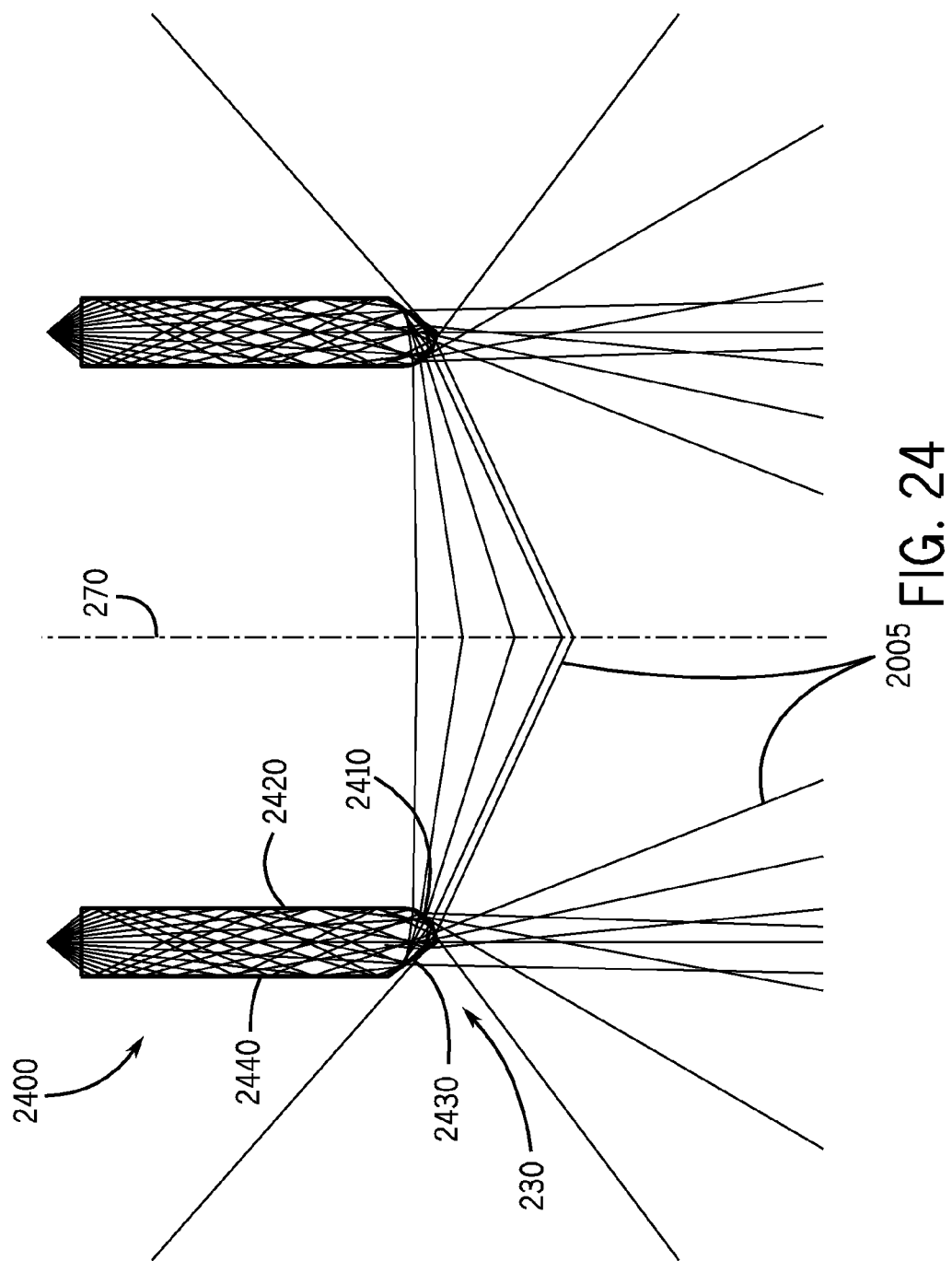

FIG. 24 details yet an additional alternative embodiment of the distal end 230 of the light pipe 2400. As can be seen, the distal end 230 includes two surfaces (although more or less are contemplated). A bottom surface 2410 is shown to be generally arced (i.e., non-planar) and extending from the inside surface 2420 of the pipe 2400. A chamfered surface 2430 extends between the bottom surface 2410 and the outside surface 2440. The chamfered surface may be at a predefined angle to the outside surface 2440, such as between zero and ninety degrees. In one embodiment, the bottom surface 2410 may be a diffusive surface, and the chamfered surface 2430 may be a polished surface. The transmitted light 2005 may be reflected internally by the chamfered surface 2430 of the light pipe 2400 to exit bottom surface 2410 and/or inside surface 2420 at a low angle as dark field illumination. The light pipe 2400 may produce a direct bright field illumination effect along with the dark field illumination through refraction of some of the transmitted light through either or both the chamfered surface 2430 and the bottom surface 2410.

Figure 25:
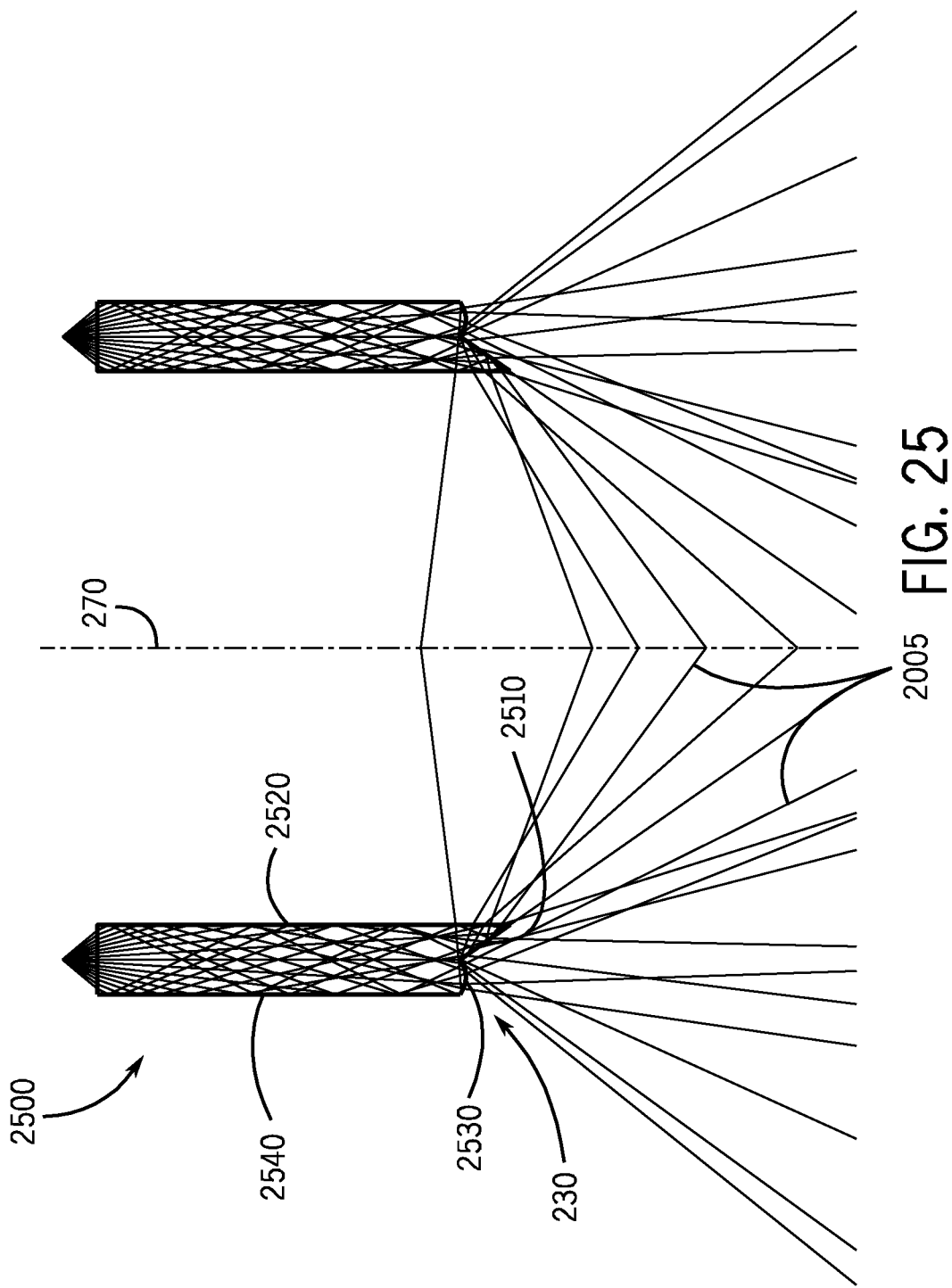

FIG. 25 details an additional alternative embodiment of the distal end 230 of the light pipe 2500. The light pipe 2500 may be considered similar to the light pipe 2400 shown in FIG. 24, except that the two surfaces are generally reverses. As can be seen in FIG. 25, the distal end 230 includes two surfaces (although more or less are contemplated). A chamfered surface 2510 is shown to be generally planar and extending from the inside surface 2520. An arced (i.e., non-planar) surface 2530 extends between the chamfered surface 2510 and the outside surface 2540. The chamfered surface may be at a predefined angle to the inside surface 2520, such as between zero and ninety degrees. In one embodiment, the chamfered surface 2510 may be a polished surface, and the arced surface 2530 may be a diffusive surface. The transmitted light 2005 may be reflected internally by the chamfered surface 2510 of the light pipe 2500 to exit inside surface 2520 at a low angle as dark field illumination. The light pipe 2500 may produce a direct bright field illumination effect along with the dark field illumination through refraction of some of the transmitted light through either or both the chamfered surface 2510 and the arced surface 2530.

Figure 26:
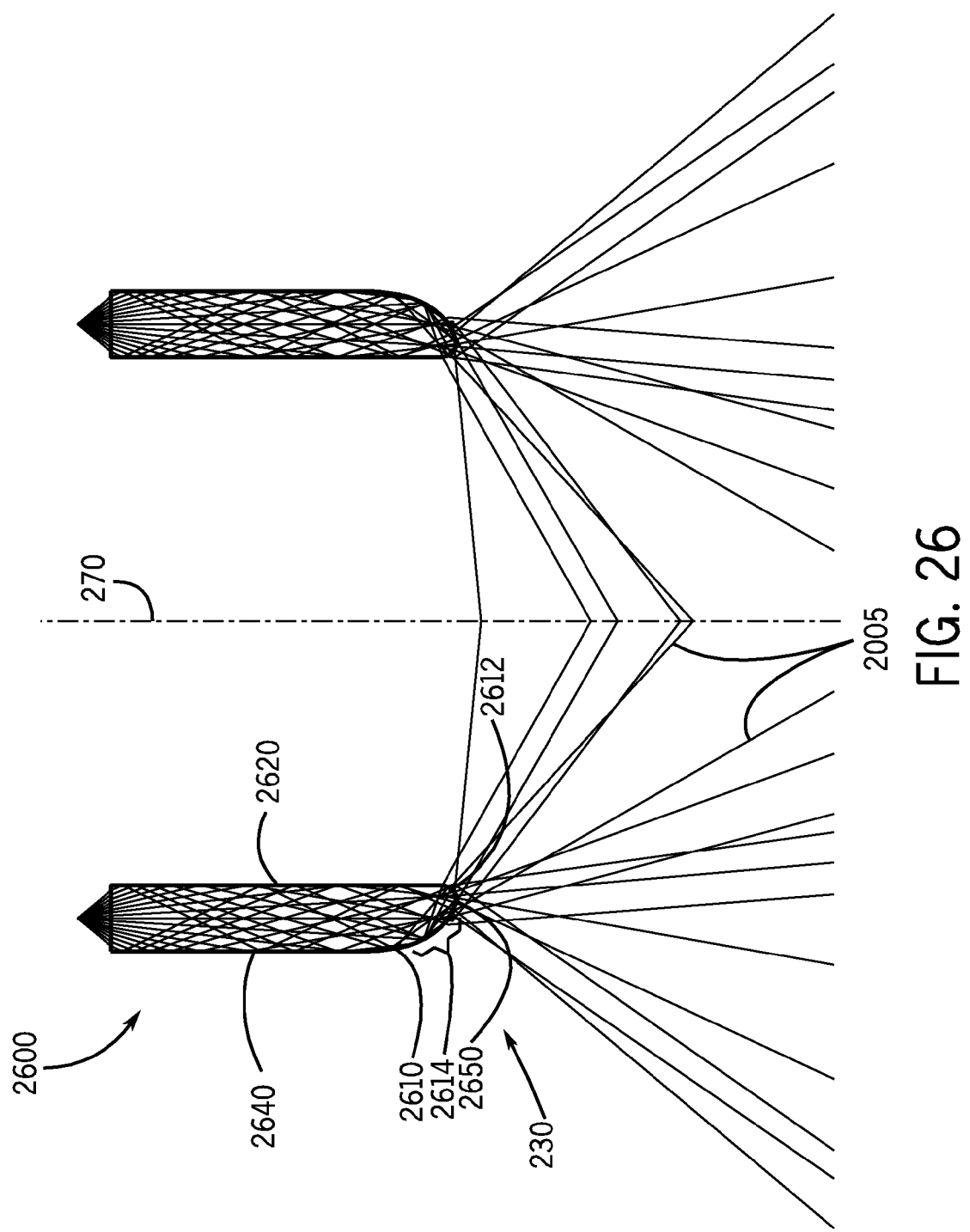

FIG. 26 details an additional alternative embodiment of the distal end 230 of the light pipe 2600. As can be seen, the distal end 230 includes one surface 2610 that is generally curvilinear in shape. The surface 2610 can be formed by the convergence of two surfaces at tip 2650. The tip 2650 can be equidistant between the inside surface 2620 and the outside surface 2640 of the pipe 2600, or the tip 2650 can be offset between the inside and outside surfaces as shown. In one embodiment, the curvilinear surface 2610 may include more than one surface treatment. As a non-limiting example, the curvilinear surface 2610 may include both a diffusive portion 2612 and a polished portion 2614. The transmitted light 2005 may be reflected internally by the polished portion 2614 of the light pipe 2600 to exit the diffusive portion 2612 and/or inside surface 2620 at a low angle as dark field illumination. The light pipe 2600 may produce a direct bright field illumination effect along with the dark field illumination through refraction of some of the transmitted light through either or both the diffusive portion 2612 and the polished portion 2614.

Figure 27:
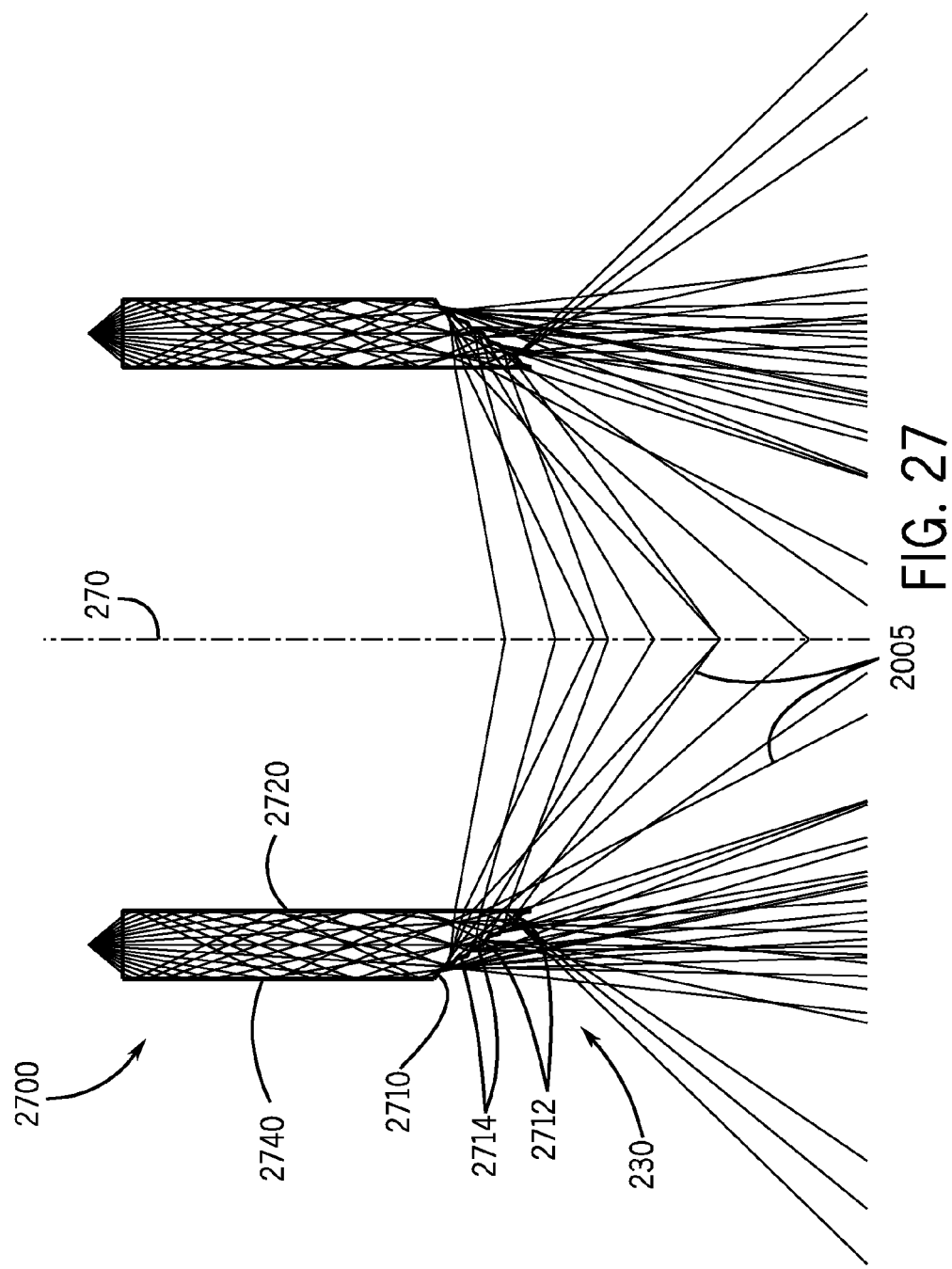

FIG. 27 details still an additional alternative embodiment of the distal end 230 of the light pipe 2700. As can be seen, the distal end 230 includes a generally stepped surface 2710 extending between the inside surface 2720 and the outside surface 2740 of the pipe 2700. As shown, each "step" is of a similar or same length, but varied lengths are also contemplated. In addition, each step is shown to have a generally consistent angular displacement with adjacent steps. Again, varied angular displacements are also considered. In one embodiment, the stepped surface 2710 may include more than one surface treatment. As a non-limiting example, the stepped surface 2710 may include both diffusive steps 2712 and polished steps 2714. The transmitted light 2005 may be reflected internally by the polished steps 2714 of the light pipe 2700 to exit the diffusive steps 2712 and/or inside surface 2720 at a low angle as dark field illumination. The light pipe 2700 may produce a direct bright field illumination effect along with the dark field illumination through refraction of some of the transmitted light through either or both the diffusive steps 2712 and the polished steps 2714.

Figure 28:
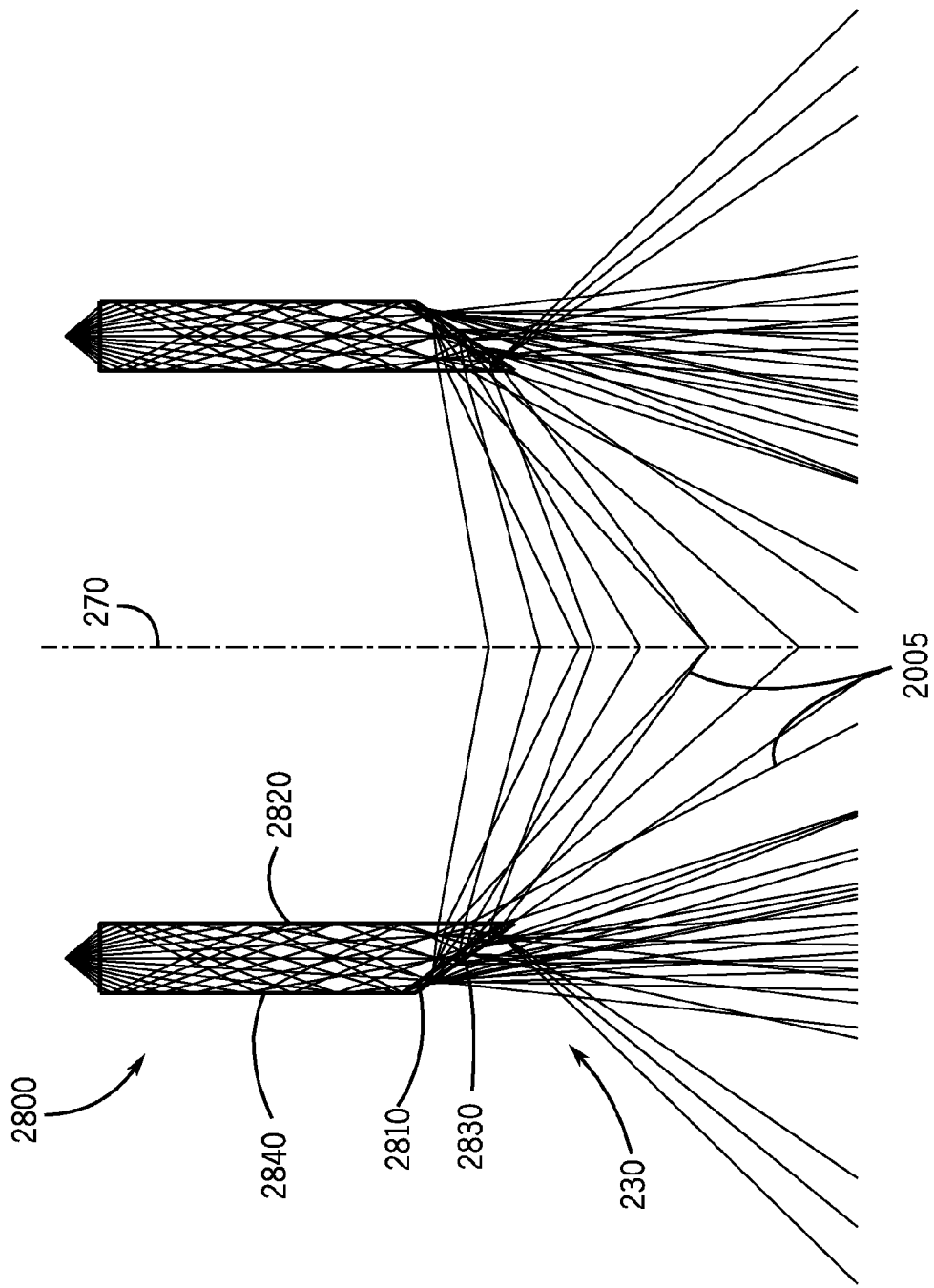

FIG. 28 details an additional alternative embodiment of the distal end 230 of the light pipe 2800. The light pipe 2800 may be considered similar to the light pipe 2300 shown in FIG. 23, except that the surface 2810 may include the addition of one or more materials 2830 with optic properties, e.g., diffusive, reflective, refractive, and/or lens properties. Both convex and concave lens varieties are contemplated, including lenses such as a holographic lens. The transmitted light 2005 may be reflected internally by the surface 2810 of the light pipe 2800 to exit inside surface 2820 at a low angle as dark field illumination. The light pipe 2800 may produce a direct bright field illumination effect along with the dark field illumination through refraction of some of the transmitted light through the surface 2810 and the material 2830. It is contemplated that the material 2830 may be a solid layer of material or may be segmented.

Figure 29:
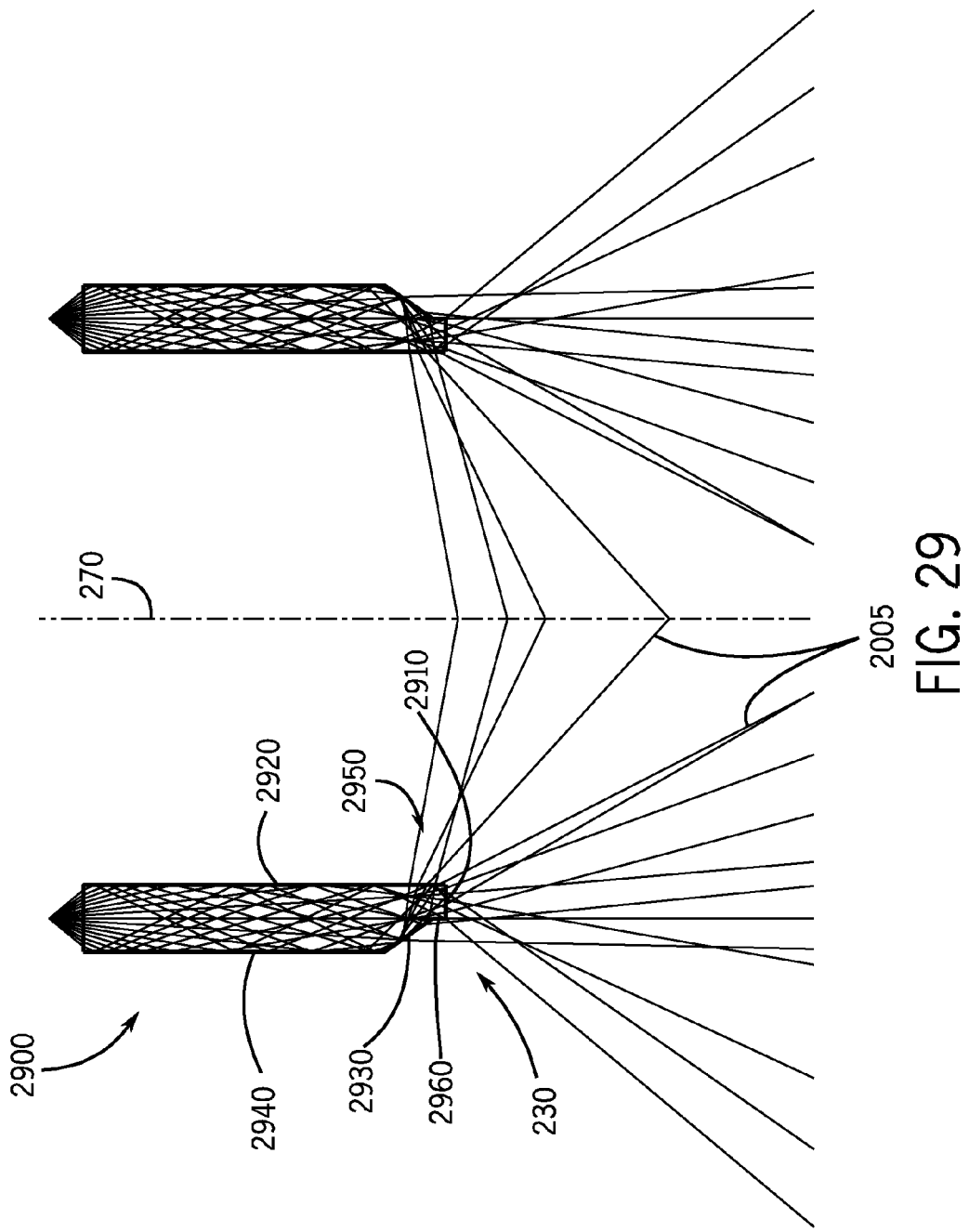

FIG. 29 details an additional alternative embodiment of the distal end 230 of the light pipe 2900. As can be seen, the distal end 230 includes three generally planar surfaces and an extended tip 2950. A bottom surface 2910 is shown to be generally perpendicular, although not required, to the inside surface 2920 of the pipe 2900. Surface 2960 is shown to be generally perpendicular, although not required, to the bottom surface 2910. A chamfered surface 2930 extends between surface 2960 and the outside surface 2940. The chamfered surface 2930 may be at predefined angles to the outside surface 2940, such as between zero and ninety degrees. In one embodiment, the extended tip 2950 may be opaque and the chamfered surface 2930 may be a polished surface. The transmitted light 2005 may be reflected internally by the chamfered surface 2930 of the light pipe 2900 to exit surface 2920 at a low angle as dark field illumination. The light pipe 2200 may produce a direct bright field illumination effect along with the dark field illumination through refraction of some of the transmitted light through the extended tip 2950 and/or the chamfered surface 2930.

Figure 30:
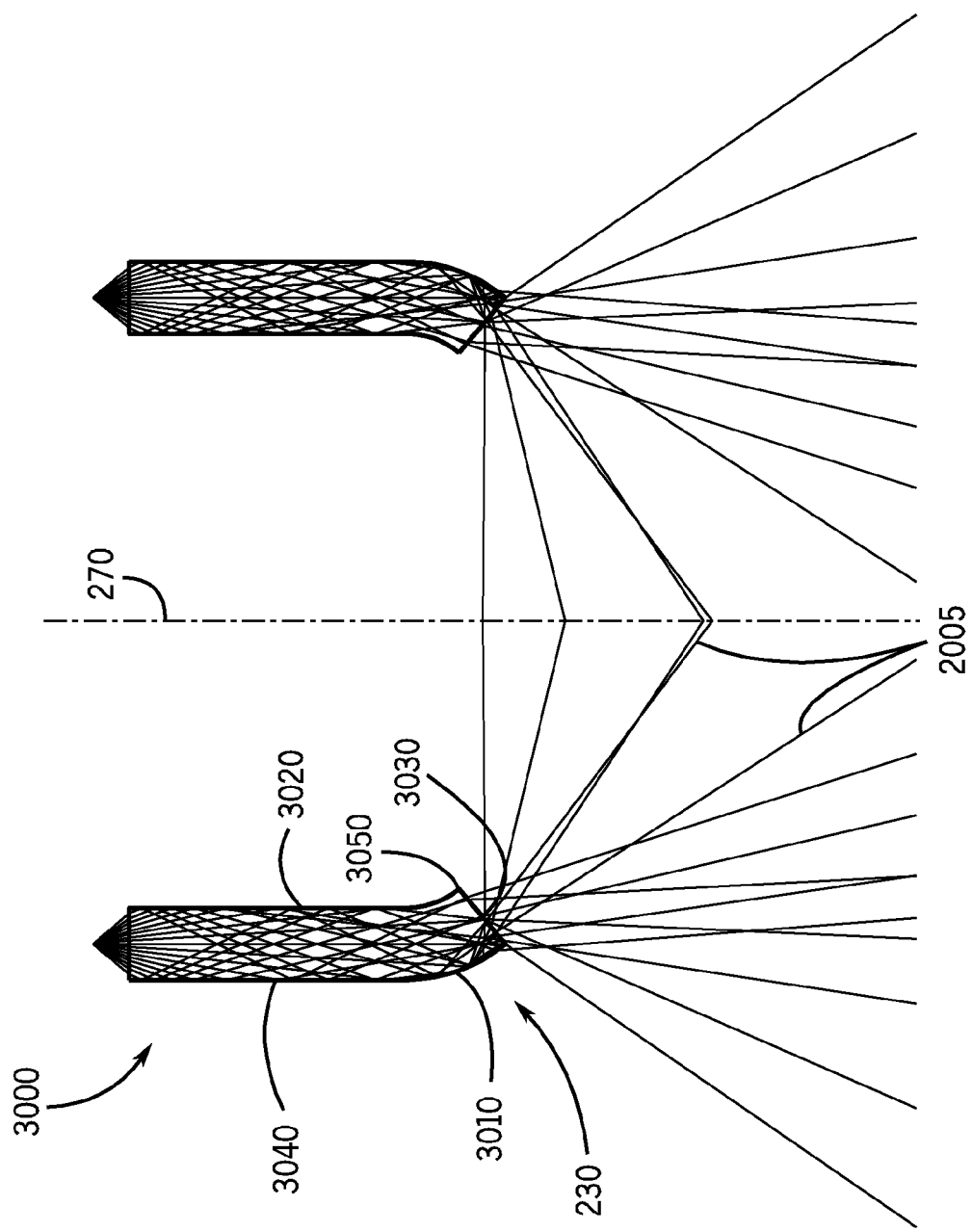

FIG. 30 details an additional alternative embodiment of the distal end 230 of the light pipe 3000. As can be seen, the distal end 230 includes two surfaces (although more or less are contemplated). A bottom surface 3010 is shown to be generally arced (i.e., non-planar) and extending from the outside surface 3040 of the pipe 3000. A chamfered surface 3030 extends between the bottom surface 3010 and the inside surface 3020, although chamfered surface 3030 may also be non-planar. Inside surface 3020 may curve or extend inward at 3050 to meet chamfered surface 3030. The chamfered surface may be at a predefined angle to the inside 3020 and/or outside surface 3040, such as between zero and ninety degrees. In one embodiment, the chamfered surface 3030 may be a diffusive surface, and the bottom surface 3010 may be a polished surface. The transmitted light 2005 may be reflected internally by the bottom surface 3010 of the light pipe 3000 to exit chamfered surface 3030 and/or inside surface 3020 at a low angle as dark field illumination. The light pipe 3000 may produce a direct bright field illumination effect along with the dark field illumination through refraction of some of the transmitted light through either or both the chamfered surface 3030 and the bottom surface 3010.

Figure 31:
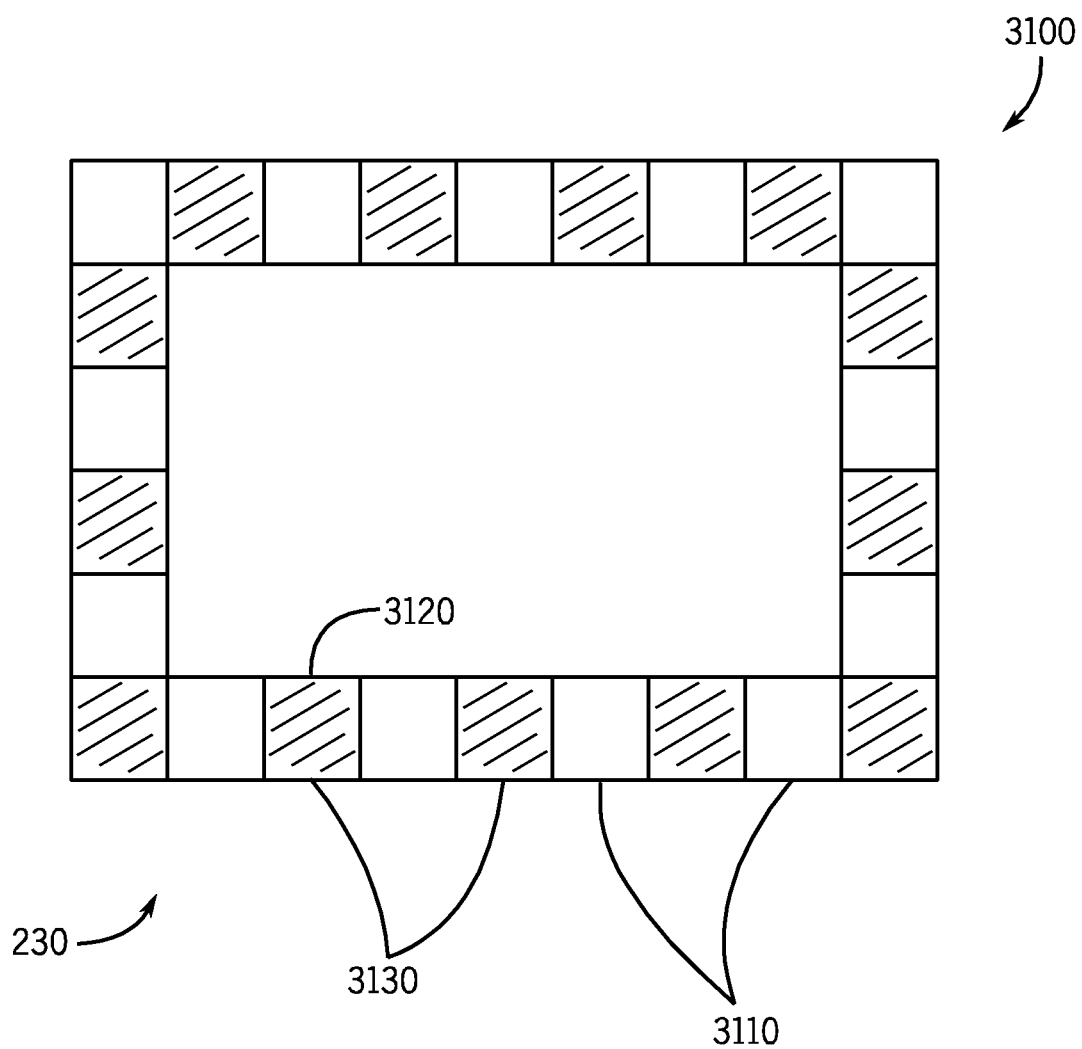
FIG. 31 is an end view of a light pipe of the illuminator assembly showing an alternative configuration of the distal end of the light pipe.

FIG. 31 details an additional alternative embodiment of the distal end 230 of the light pipe 3100. As can be seen in the end view, the distal end 230 is staggered to include more than one end configuration. As shown, the distal end 230 includes staggered flat surfaces 3110 and chamfered surfaces 3130. It is contemplated that the distal end can include any number of end configurations, and can include any combination of the light pipe configurations described herein. It is also contemplated that the light pipe may comprise shapes other than the rectilinear shape as shown. For example, in an end view, the light pipe may be square, triangular, elliptical, curved, ovular, or circular, as non-limiting examples. The transmitted light 2005 may be reflected internally by the chamfered surface 3130 of the light pipe 3100 to exit internal surface 3120 at a low angle as dark field illumination. The light pipe 3100 may produce a direct bright field illumination effect along with the dark field illumination through refraction of some of the transmitted light through the flat surfaces 3110 and/or the chamfered surfaces 3130.

In one embodiment, one or more of the above described surfaces may include a dielectric coating. The application of one or more dielectric coatings provides the opportunity to "tune" the light pipe so as to allow light of one wavelength to pass or transmit through the coating, and to allow light of a different wavelength to reflect.

In an additional embodiment, one or more diffusive/diffractive materials may be applied to any of the above described surfaces. For example, known optical diffusers include ground glass diffusers, Teflon diffusers, holographic diffusers, opal glass diffusers, and greyed glass diffusers, as non-limiting examples.

It is to be appreciated that the distal end 230 of the light pipes described herein may be a separate component or components that are coupled to a light pipe, or the distal end may be unitary with the light pipe. The terms "light transmitter" and "light pipe" are used interchangeably and in a non-limiting way, and are meant to define a configuration of light transmissive material. Accordingly, a light pipe may consist of only the distal end portion as previously described, i.e., a portion just long enough to provide the desired optical effect, such as bright field and/or dark field illumination, or conversely, a light pipe may comprise a device having a length plus the distal end portion. It is also to be appreciated that the embodiments described above are not limited to the surface treatments as described. For example, one or more lenses or other materials may be applied over or under any of the diffusive and/or textured surfaces and/or materials described, or linear surfaces may be non-linear or stepped (as shown in FIG. 27), or any combination of the above described treatments. It is also contemplated that the light pipe configurations described above may comprise one or more individual portions, such as four quadrants as described above, so as to allow different sections to be individually controlled and provide varied illuminating effects based on the application and/or desired results. It is also contemplated that the light pipe configurations described above may comprise one or more nested (e.g., concentric) light pipes, so as to allow individual light pipes to be individually controlled and provide varied illuminating effects based on the application and/or desired results. It should be clear from the above-described embodiments, that a reader having superior illumination and mark-reading capabilities is described herein. This reader alleviates many of the disadvantages encountered with prior art readers, and provides improved object-illumination, status-indication and overall durability.

The foregoing has been a detailed description of illustrative embodiments of the invention. Various modifications and additions can be made without departing from the spirit and scope thereof. For example, any of the various features described herein can be combined with some or all of the other features described herein according to alternate embodiments. Additionally, while a plurality of multicolor LEDs are provided, individual monochromatic LEDs each in a plurality of colors can be arranged adjacent to each other on the illumination ring in alternate embodiments. Likewise, while a ring divided into quadrants is shown, any acceptable division of the overall ring can be provided according to alternate embodiments. Certain parts of the overall ring can be made to work together with other parts according to embodiments hereof. For example, top and right may always work together or top and bottom may always work together. Likewise, additional ring colors, such as yellow can be employed to provide further types of indicators. Multi-colored illumination sources or a plurality of adjacent individual illumination sources (or combinations of individual and multi-colored sources) can be used to generate the desired seat of ring colors. Moreover, while a rectangular light pipe is shown and described, a greater range of depth of field may be obtained by providing a non-equilateral shape having more than four sides joined by corners (for example, an oblique hexagon). This invention contemplates polygonal light pipe cross sections having four or more sides (linear or curvilinear) joined at corners (that may be rounded). Finally, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

We claim:

1. An illumination assembly for a mark reader comprising:
    a light transmitter arranged in a surrounding relationship to an interior area, the light transmitter having a proximal end and a distal end;
    an illumination source adapted to provide a light for transmission into the light transmitter; and
    the light transmitter distal end including a first portion and a second portion, the first portion being adapted to allow a portion of the light from within the light transmitter to pass through and out of the distal end to provide bright field illumination, and the second portion being adapted to internally reflect and redirect a different portion of the light to exit the distal end to provide dark field illumination.

2. The illumination assembly as in claim 1 wherein the light transmitter includes an interior wall and an exterior wall, and the distal end extends between the interior wall and the exterior wall.

3. The illumination assembly as in claim 2 wherein the light transmitted through the light transmitter is internally reflected along the interior and exterior walls of the light transmitter and is refracted by the first portion and is internally reflected by the second portion.

4. The illumination assembly as in claim 2 wherein the light is internally reflected by the second portion and exits through the interior wall of the light transmitter facing the interior area as dark field illumination.

5. The illumination assembly as in claim 1 wherein at least one of the first portion and the second portion includes an additional material applied to the surface of the at least one of the first portion and the second portion.

6. The illumination assembly as in claim 1 wherein at least one of the first portion and the second portion is curvilinear.

7. The illumination assembly as in claim 1 wherein both of the first portion and the second portion are linear.

8. The illumination assembly as in claim 1 wherein both of the first portion and the second portion combine to form a linear surface.

9. The illumination assembly as in claim 1 wherein both of the first portion and the second portion are curvilinear.

10. A light transmitting assembly for illuminating a mark that is imaged by an image sensor, the light transmitting assembly comprising:
    a light transmitter arranged in a surrounding relationship to an interior area, the light transmitter having a proximal end and a distal end;
    an illumination source adapted to provide a light for transmission into the light transmitter; and
    the light transmitter distal end including a chamfered surface and a diffusive surface, the diffusive surface being adapted to allow a first portion of the light from within the light transmitter to pass through and out of the diffusive surface to provide bright field illumination, and the chamfered surface being adapted to internally reflect and redirect a second portion of the light so the second portion of the light exits the distal end to provide dark field illumination.

11. The light transmitting assembly as in claim 10 wherein the chamfered surface is adapted to allow an additional portion of the light from within the light transmitter to pass through and out of the chamfered surface to provide additional bright field illumination.

12. The light transmitting assembly as in claim 10 wherein the light transmitter is constructed from polycarbonate.

13. The light transmitting assembly as in claim 10 wherein the light transmitter is a molded single piece device.

14. The light transmitting assembly as in claim 10 wherein at least one of the chamfered surface and the diffusive surface includes an additional material applied to the surface.

15. The light transmitting assembly as in claim 10 wherein the bright field illumination is sufficient to obtain an image of the mark by the image sensor.

16. An illumination assembly for a mark reader comprising:
    a light transmitter arranged in a surrounding relationship to an interior area, the light transmitter having an internal wall, an external wall, a proximal end, and a distal end;
    an illumination source adapted to provide a light for transmission into the light transmitter; and
    the light transmitter distal end adapted to allow at least a portion of the light from within the light transmitter to pass through and out of the distal end to provide bright field illumination, and the distal end being adapted to internally reflect and redirect a different portion of the light so the different portion of the light exits the interior wall to provide dark field illumination.

17. The illumination assembly as in claim 16 wherein the at least a different portion of the light exits the interior wall near the distal end to provide the dark field illumination.

18. An illumination assembly for a mark reader comprising:
    a light transmitter arranged in a surrounding relationship to an interior area, the light transmitter having an internal wall, an external wall, a proximal end, and a distal end;
    an illumination source adapted to provide a light for transmission into the light transmitter; and
    the light transmitter distal end comprising a first flat surface and a second flat surface different than the first flat surface, the first flat surface adapted to allow a portion of the light from within the light transmitter to pass through and out of the distal end to provide bright field illumination, and the second flat surface adapted to allow a different portion of the light to pass through and out of the distal end to provide dark field illumination.

19. The illumination assembly as in claim 18 wherein the at least a different portion of the light exits the interior wall near the distal end to provide the dark field illumination.

20. The illumination assembly as in claim 18 wherein at least one of the first flat surface and the second flat surface is a chamfered surface.

21. An illumination assembly for a mark reader comprising:
- a light transmitter arranged in a surrounding relationship to an interior area, the light transmitter having a proximal end and a distal end;
- an illumination source adapted to provide a light for transmission into the light transmitter; and
- the light transmitter distal end including a first portion and a second portion, the first portion being adapted to allow a portion of the light from within the light transmitter to pass through and out of the distal end to provide bright field illumination, and the second portion being adapted to internally reflect and redirect a different portion of the light to exit near the distal end to provide dark field illumination.

22. The illumination assembly as in claim 21 wherein the illumination source is adapted to provide the light for transmission into at least one of an exterior wall and an interior wall and the proximal end of the light transmitter.

23. An illumination assembly for a mark reader comprising:
- a light transmitter arranged in a surrounding relationship to an interior area, the light transmitter having a proximal end and a distal end;
- an illumination source adapted to provide a light for transmission into the light transmitter; and
- the light transmitter distal end adapted to allow the light from within the light transmitter to pass through and out of the distal end to provide bright field illumination, and the light transmitter distal end being adapted to allow the light from within the light transmitter to pass through and out of the distal end to provide dark field illumination.

24. The illumination assembly as in claim 23 wherein the light transmitter distal end is adapted to internally reflect and redirect a portion of the light so the portion of the light exits the interior wall near the distal end to provide dark field illumination.

25. The illumination assembly as in claim 23 wherein the light transmitter distal end includes a first portion and a second portion, the first portion being adapted to allow the light from within the light transmitter to pass through and out of the first portion to provide bright field illumination, and the second portion being adapted to allow the light from within the light transmitter to pass through and out of the second portion to provide dark field illumination.

26. The illumination assembly as in claim 23 wherein the light transmitter includes an interior wall and an exterior wall, and the distal end extends between the interior wall and the exterior wall.

27. The illumination assembly as in claim 23 wherein the light transmitter distal end comprises a chamfered surface.

28. A method for providing bright field illumination and dark field illumination, the method comprising:
- providing a light transmitter arranged in a surrounding relationship to an interior area, the light transmitter having a proximal end and a distal end;
- providing an illumination source for providing a light for transmission into the light transmitter;
- allowing the light from within the light transmitter to pass through and out of the distal end for providing bright field illumination; and
- allowing the light from within the light transmitter to pass through and out of the distal end for providing dark field illumination.

29. The method as in claim 28 further comprising activating the illumination source and providing the light into the light transmitter.

30. The method as in claim 28 further comprising internally reflecting and redirecting a portion of the light so the portion of the light exits the interior wall near the distal end for providing dark field illumination.

31. The method as in claim 28 wherein the light transmitter distal end includes a first portion and a second portion, the first portion allowing the light from within the light transmitter to pass through and out of the first portion for providing bright field illumination, and the second portion allowing the light from within the light transmitter to pass through and out of the second portion for providing dark field illumination.

32. The method as in claim 28 wherein the light transmitter includes an interior wall and an exterior wall, and the distal end extends between the interior wall and the exterior wall.

33. The method as in claim 28 wherein the light transmitter distal end comprises a chamfered surface.

34. A method comprising:
- providing a light transmitter and arranging the light transmitter in a surrounding relationship to an interior area, the light transmitter having a proximal end and a distal end;
- providing an illumination source and arranging the illumination source for providing a light for transmission into the light transmitter; and
- using a first portion and a second portion of the light transmitter distal end, the first portion allowing a portion of the light from within the light transmitter to pass through and out of the distal end for providing bright field illumination, and the second portion internally reflecting and redirecting a different portion of the light to exit near the distal end for providing dark field illumination.

35. The method as in claim 34 further comprising providing the light for transmission into at least one of an exterior wall and an interior wall and the proximal end of the light transmitter.

36. The method as in claim 34 further comprising applying an additional material to a surface of at least one of the first portion and the second portion.

* * * * *